US012493139B2

(12) United States Patent
Zhang et al.

(10) Patent No.: US 12,493,139 B2
(45) Date of Patent: Dec. 9, 2025

(54) DISPLAY ASSEMBLY, DISPLAY APPARATUS AND VR/AR DISPLAY DEVICE

(71) Applicant: BOE TECHNOLOGY GROUP CO., LTD., Beijing (CN)

(72) Inventors: Angran Zhang, Beijing (CN); Can Zhang, Beijing (CN); Can Wang, Beijing (CN); Xiaochuan Chen, Beijing (CN); Tao Hong, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 888 days.

(21) Appl. No.: 17/631,279

(22) PCT Filed: Jan. 21, 2021

(86) PCT No.: PCT/CN2021/073141

§ 371 (c)(1),
(2) Date: Jan. 28, 2022

(87) PCT Pub. No.: WO2021/147963

PCT Pub. Date: Jul. 29, 2021

(65) Prior Publication Data

US 2022/0252765 A1 Aug. 11, 2022

(30) Foreign Application Priority Data

Jan. 23, 2020 (CN) ........................ 202020146775.0

(51) Int. Cl.
*G02B 3/00* (2006.01)
*G02B 27/01* (2006.01)

(52) U.S. Cl.
CPC ........ *G02B 3/0037* (2013.01); *G02B 27/0172* (2013.01)

(58) Field of Classification Search
CPC ...... G02B 3/0037; G02B 3/0006–0068; G02B 27/017; G02B 27/0172; G02B 2027/0118; G02B 30/27; H04N 13/305; H10K 50/858
See application file for complete search history.

(56) References Cited

U.S. PATENT DOCUMENTS

| | | | | |
|---|---|---|---|---|
| 10,288,884 | B1 * | 5/2019 | Gollier | G02B 27/0961 |
| 11,087,701 | B1 * | 8/2021 | Chen | G02B 6/0055 |
| 2017/0315372 | A1 * | 11/2017 | Bang | G02B 27/0081 |

FOREIGN PATENT DOCUMENTS

| | | |
|---|---|---|
| CN | 101706623 A | 5/2010 |
| CN | 102184678 A | 9/2011 |

(Continued)

*Primary Examiner* — Bumsuk Won
*Assistant Examiner* — Samanvitha Sridhar
(74) *Attorney, Agent, or Firm* — XSENSUS LLP

(57) ABSTRACT

A display assembly includes a display panel and a light adjusting layer disposed on a light-emitting side of the display panel. The display panel has a middle display region and a peripheral display region, and is configured to project light towards an optical device. An orthographic projection of the light adjusting layer on the display panel at least partially overlaps with the peripheral display region. The light adjusting layer is configured to: deflect at least a portion of light emitted to a first region of the optical device and at least a portion of light emitted to an outer side of the optical device among light emitted from the peripheral display region, after passing therethrough; and emit the deflected light to a second region of the optical device. The second region is farther away from a center of the optical device than the first region.

19 Claims, 28 Drawing Sheets

(56) References Cited

FOREIGN PATENT DOCUMENTS

| | | | | |
|---|---|---|---|---|
| CN | 102346326 | A | | 2/2012 |
| CN | 102830533 | A | | 12/2012 |
| CN | 110596901 | A | | 12/2019 |
| CN | 211236456 | U | | 8/2020 |
| KR | 101985606 | B1 | * | 6/2019 |
| WO | 02/075440 | A1 | | 9/2002 |

* cited by examiner

4

4

DISPLAY ASSEMBLY, DISPLAY APPARATUS AND VR/AR DISPLAY DEVICE

CROSS-REFERENCE TO RELATED APPLICATIONS

This application is a national phase entry under 35 USC 371 of International Patent Application No. PCT/CN2021/073141 filed on Jan. 21, 2021, which claims priority to Chinese Patent Application No. 202020146775.0, filed on Jan. 23, 2020, which are incorporated herein by reference in their entirety.

TECHNICAL FIELD

The present disclosure relates to the field of display technologies, and in particular, to a display assembly, a display apparatus and a VR/AR display device.

BACKGROUND

Virtual reality (VR) technology is a high-tech involving many disciplines, which integrates computer simulation, three-dimensional design, image manipulation, pattern recognition, microelectronics and parallel processing technology to create a realistic virtual environment by using a virtual reality hardware device and a computer system. Users experience the same feelings in the virtual space as in the real world, such as vision, hearing, touch, smell, collision, dynamic interaction of moving and carrying, etc.

Augmented reality (AR) technology is also known as enhanced reality technology. By applying virtual information to the real world, the real-world environment and virtual objects are superimposed on the same picture or space in real time, which not only shows the real-world information, but also displays the virtual information at the same time, and the two types of information complement and superimpose each other.

At present, VR and AR display devices may be liquid crystal on silicon (LCOS) display assemblies or organic light-emitting diode (OLED) display assemblies with optical devices (e.g., curved prisms) superimposed thereon, and pictures displayed by the display assemblies can be received by human eyes.

SUMMARY

In one aspect, a display assembly is provided. The display assembly includes a display panel and a light adjusting layer. The display panel has a display region. The display region includes a middle display region and a peripheral display region located around the middle display region. The display panel is configured to project light towards an optical device.

The light adjusting layer is disposed on a light-emitting side of the display panel, and an orthographic projection of the light adjusting layer on the display panel at least partially overlaps with the peripheral display region. The light adjusting layer is configured to: deflect at least a portion of light emitted to a first region of the optical device and at least a portion of light emitted to an outer side of the optical device among light emitted from the peripheral display region of the display panel, after passing through the light adjusting layer; and emit the deflected light to a second region of the optical device. The second region is farther away from a center of the optical device than the first region.

In some embodiments, the peripheral display region includes: a first sub-region and a second sub-region located on opposite sides of the middle display region in a first direction, and a third sub-region and a fourth sub-region located on opposite sides of the middle display region in a second direction. The first direction intersects with the second direction.

The light adjusting layer includes at least one light adjusting unit, and the light adjusting unit is located in at least one of the first sub-region, the second sub-region, the third sub-region and the fourth sub-region. The light adjusting unit is configured to: deflect at least a portion of light emitted to the first region of the optical device and at least a portion of light emitted to the outer side of the optical device among light emitted from the sub-region where the light adjusting unit is located, after passing through the light adjusting unit; and emit the deflected light to the second region of the optical device.

In some embodiments, the light adjusting layer includes two first light adjusting units, and the two first light adjusting units are located in the first sub-region and the second sub-region. And/or the light adjusting layer includes two second light adjusting units, and the two second light adjusting units are distributed in the third sub-region and the fourth sub-region.

In some embodiments, the display panel includes a plurality of sub-pixels disposed in the display region, and each sub-pixel has an opening region. A light adjusting unit includes a plurality of lenses arranged in an array, each lens corresponds to at least one sub-pixel disposed in a sub-region where the light adjusting unit is located, and an orthographic projection of each lens on the display panel at least partially overlaps with an opening region of the at least one sub-pixel corresponding thereto. Or a light adjusting unit includes a single lens, the lens corresponds to at least one sub-pixel disposed in a sub-region where the lens is located, and an orthographic projection of the lens on the display panel at least partially overlaps with an opening region of the at least one sub-pixel corresponding thereto.

In some embodiments, sub-pixels corresponding to different lenses are different.

In some embodiments, in a plane direction of the display panel, a border of the light adjusting unit proximate to the middle display region is farther away from the middle display region than a border of the sub-region where the light adjusting unit is located proximate to the middle display region.

In some embodiments, in the plane direction of the display panel, a border of the lens proximate to the middle display region is farther away from the middle display region than a border of a region where the at least one sub-pixel corresponding thereto is located proximate to the middle display region.

In some embodiments, in a case where the light adjusting unit includes the plurality of lenses, each lens corresponds to a single sub-pixel, and the orthographic projection of each lens on the display panel partially overlaps with an opening region of the sub-pixel corresponding thereto. In the plane direction of the display panel, a border of the lens proximate to the middle display region is farther away from the middle display region than a border of the opening region of the sub-pixel corresponding thereto proximate to the middle display region.

In some embodiments, in a direction parallel to a border of the middle display region proximate to the lens, a dimension of the lens is greater than a dimension of the opening region of the sub-pixel corresponding thereto.

In some embodiments, in a symmetric line of a surface of the lens and along a direction from the middle display region to the lens, a border of the lens away from the middle display region is located in a space region between the opening region of the sub-pixel corresponding thereto and an opening region of a sub-pixel adjacent to the sub-pixel.

In some embodiments, a center of the lens is farther away from the middle display region of the display panel than a center of the opening region of the sub-pixel corresponding thereto.

In some embodiments, an area of the opening region of the sub-pixel corresponding to the lens is greater than an area of an opening region of each of sub-pixels not corresponding to the lens.

In some embodiments, a surface of the lens away from the display panel includes a curved surface convex relative to the display panel.

In some embodiments, a surface of the lens away from the display panel includes at least one of a spherical surface, an ellipsoidal surface, a cambered surface and a sawtooth surface.

In some embodiments, a shape of the orthographic projection of the lens on the display panel is a circle, an ellipse or a rectangle.

In some embodiments, the display panel includes a plurality of sub-pixels arranged in the display region, and an average value of areas of opening regions of sub-pixels disposed in the middle display region is less than an average value of areas of opening regions of sub-pixels disposed in the peripheral display region.

In some embodiments, in a direction from a center of the display panel to an edge of the display panel, areas of opening regions of the plurality of sub-pixels increase.

In some embodiments, the display panel includes a display substrate and an encapsulation layer disposed between the display substrate and the light adjusting layer.

In some embodiments, the display assembly further includes a protective layer covering a surface of the light adjusting layer away from the display panel. A refractive index of the protective layer is less than a refractive index of the light adjusting layer.

In another aspect, a display apparatus is provided. The display apparatus includes an optical device and the display assembly as described in any one of the above embodiments. The optical device is disposed at a light-emitting side of the display assembly, and the optical device is configured to receive light emitted from the display assembly.

In yet another aspect, a virtual reality/augmented reality (VR/AR) display device is provided. The VR/AR display device includes the display apparatus as described in any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
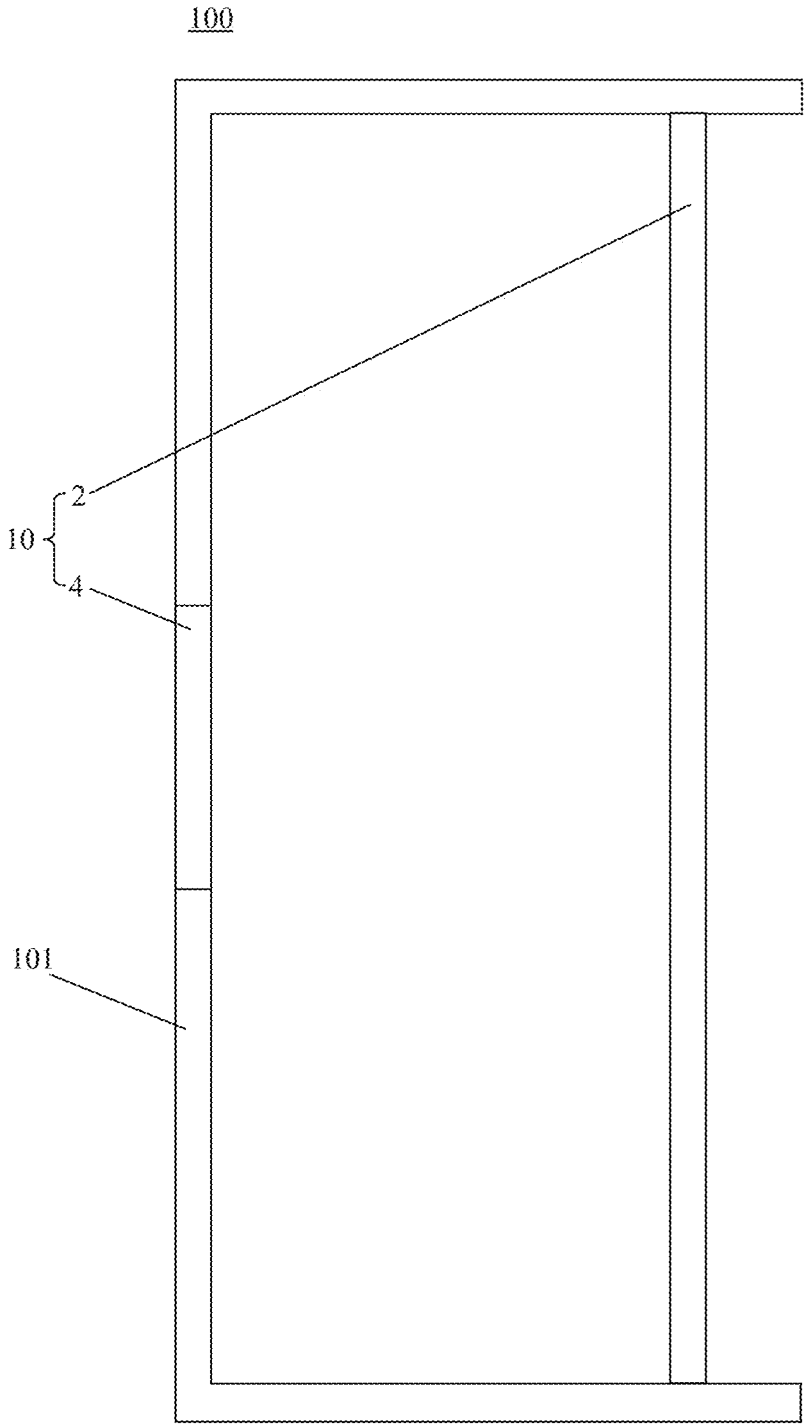
FIG. 1 is a structural diagram of a VR/AR display device, in accordance with some embodiments of the present disclosure.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open, inclusive sense, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only and are not to be construed as indicating or implying relative importance or implicitly indicating the number of indicated technical features. Thus, features defined by the terms "first" and "second" may explicitly or implicitly include one or more of the features. In the description of the embodiments of the present disclosure, the term "a plurality of/the plurality of" means two or more unless otherwise specified.

The phrase "A and/or B" includes the following three combinations: only A, only B, and a combination of A and B.

The use of the phrase "applicable to" or "configured to" herein means an open and inclusive expression, which does not exclude devices that are applicable to or configured to perform additional tasks or steps.

Exemplary embodiments are described herein with reference to sectional views and/or plan views as idealized exemplary drawings. In the accompanying drawings, thicknesses of layers and regions are enlarged for clarity. Thus, variations in shape relative to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region that is shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

As shown in FIG. 1, some embodiments of the present disclosure provide a virtual reality/augmented reality (VR/AR) display device 100 including a housing 101 and a display apparatus 10 disposed in the housing 101.

In some embodiments, as shown in FIG. 1, the display apparatus 10 includes a display assembly 4 and an optical device 2. The optical device 2 is disposed at a side of the display assembly 4 configured to be proximate to human eyes, and the optical device 2 is configured to receive light emitted from the display assembly 4.

Figure 2:
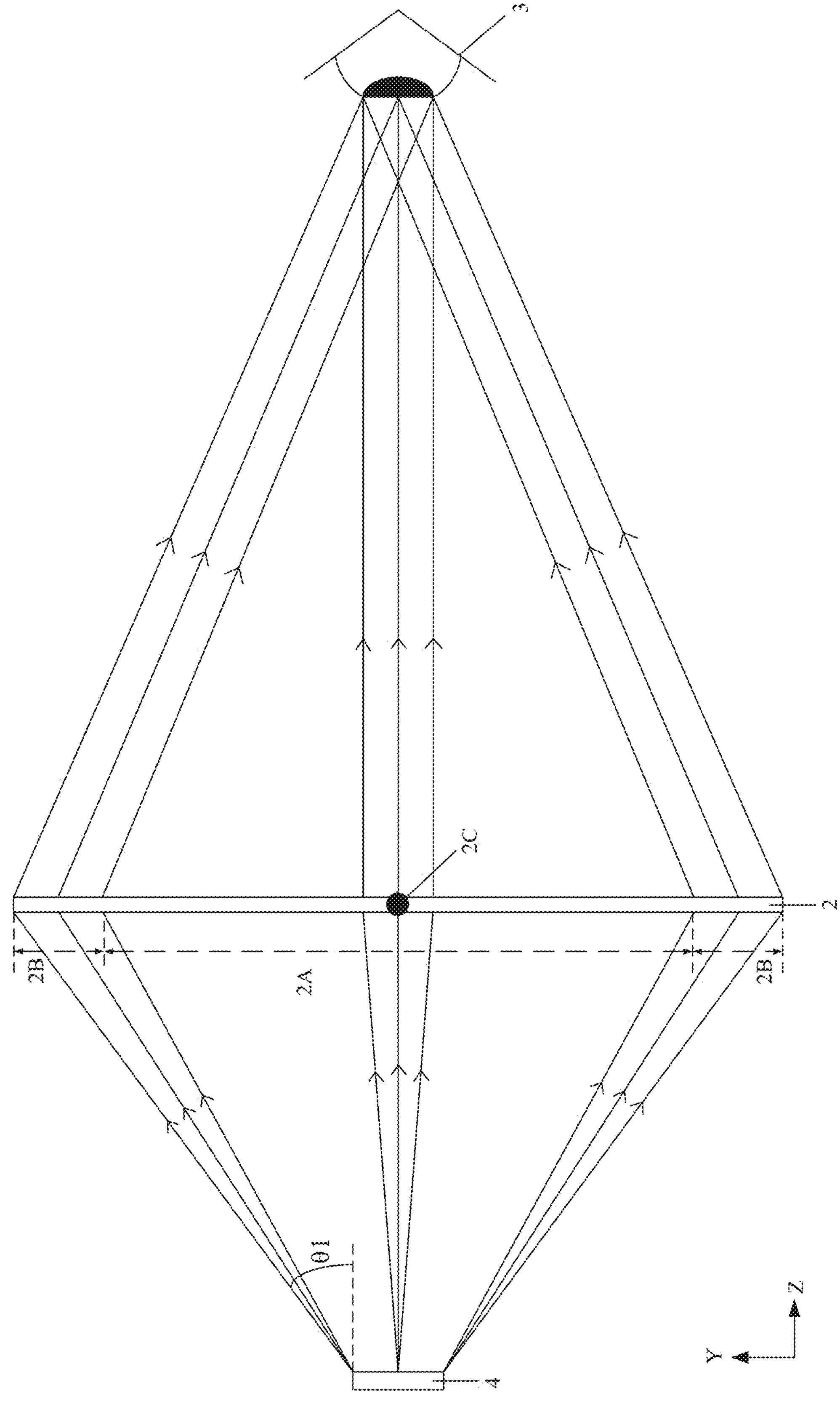
FIG. 2 is an optical path diagram of a VR/AR display device, in accordance with some embodiments of the present disclosure.

For example, the optical device 2 may be a curved prism. As shown in FIG. 2, an optical image formed by the light emitted from the display assembly 4 can be focused on retinas of human eyes 3 after passing through the optical device 2, so that the human eyes 3 can see a clear image.

Figure 3A:
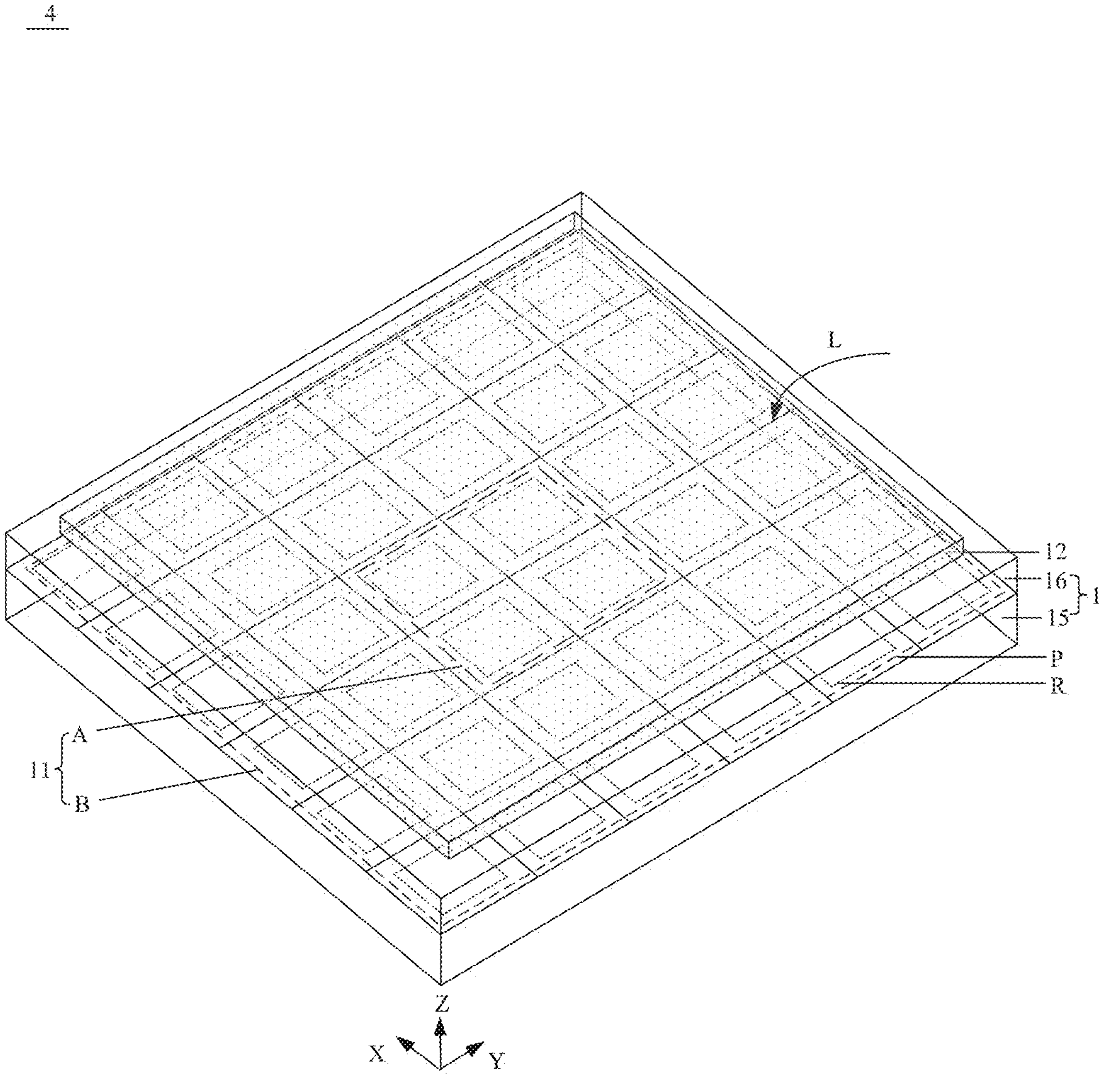
FIG. 3A is a structural diagram of a display assembly, in accordance with some embodiments of the present disclosure.
Figure 3B:
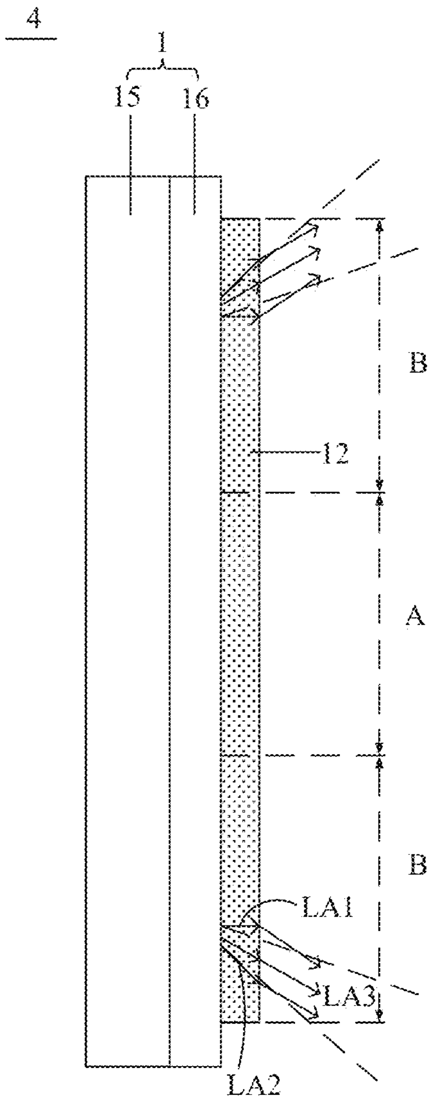
FIG. 3B is a side view of the display assembly in FIG. 3A.

As shown in FIGS. 2, 3A and 3B, some embodiments of the present disclosure provide the display assembly 4 including a display panel 1 and a light adjusting layer 12. The display panel 1 has a display region 11, which includes a middle display region A and a peripheral display region B located around the middle display region A. The display panel 1 is configured to project light towards the optical device 2.

It will be noted that, the "middle display region A" refers to a region located in the display region 11 in a direction Z perpendicular to the display panel 1 and overlapping with a center of the display region 11, for example, the middle display region A shown in FIG. 3A is in a shape of a rectangle; and the "peripheral display region B" refers to a region located around the middle display region A, for example, the peripheral display region B shown in FIG. 3A is in a shape of a frame.

Moreover, when the human eyes 3 face directly the center of the display region 11 of the display panel 1, a viewing angle of the peripheral display region B is greater than a viewing angle of the middle display region A. For example, as shown in FIG. 3A, in a first direction Y, a ratio of a dimension of the middle display region A to a dimension of the display region 11 is greater than or equal to one third and less than one; and in a second direction X, a ratio of a dimension of the middle display region A to a dimension of the display region 11 is greater than or equal to one third and less than one. For example, in the first direction Y, the ratio of the dimension of the middle display region A to the dimension of the display region 11 is equal to one third; and in the second direction X, the ratio of the dimension of the middle display region A to the dimension of the display region 11 is equal to one third.

It will be noted that, two concepts, i.e., the "middle display region" and the "peripheral display region" are used herein to distinguish different regions in the display region, and the two concepts are relative concepts, that is, the "middle display region" passes through the center of the display region, and the "peripheral display region" is closer to a border of the display region than the "middle display region". A boundary between the "middle display region" and the "peripheral display region" and a specific dimension ratio of the "middle display region" and the "peripheral display region" are not limited.

It will be understood that, as shown in FIG. 2, light emitted from the peripheral display region B at an angle greater than θ1 cannot be received by the optical device 2.

For example, the display panel 1 may be a micro organic electroluminescence (micro organic light-emitting diode (Micro OLED)) display panel or a liquid crystal on silicon (LCOS) display panel.

The light adjusting layer 12 is disposed on a light-emitting side L of the display panel 1, and an orthographic projection of the light adjusting layer 12 on the display panel 1 at least partially overlaps with the peripheral display region B. As shown in FIGS. 2 and 3B, the light adjusting layer 12 is configured to: deflect at least a portion of light emitted to a first region 2A of the optical device 2 (as indicated by the arrowed line LA1 in FIG. 3B) and at least a portion of light emitted to an outer side of the optical device 2 (as indicated by the arrowed line LA2 in FIG. 3B) among light emitted from the peripheral display region B of the display panel 1, after passing through the light adjusting layer 12; and emit the deflected light to a second region 2B of the optical device 2 (as indicated by the arrowed lines LA3 in FIG. 3B). The second region 2B is farther away from a center 2C of the optical device 2 than the first region 2A.

It will be noted that two concepts, i.e., the "first region" and the "second region" are used herein to distinguish different regions in the optical device, and the two concepts are relative concepts, that is, the "second region" is farther away from the center 2C of the optical device 2 than the "first region". The "first region" and the "second region" are not two fixed regions in the optical device 2, but differ with regard to difference in light exit angle. For example, for light emitted at a certain angle, in a case where the light adjusting layer 12 is not provided, the light will be projected towards a certain region of the optical device 2, i.e., the "first region"; and in a case where the light adjusting layer 12 is provided, due to a deflection effect of the light adjusting layer 12 on the light, a propagation direction of the light is changed, and the light will be projected towards the "second region". That is, the "first region" is a projection region of light on the optical device 2 in a case where light is not affected by the light adjusting layer 12, and the "second region" is a projection region of light on the optical device 2 in a case where light is affected by the light adjusting layer 12.

For example, as shown in FIG. 2, the "first region 2A" refers to a region overlapping with the center of the optical device 2 in a direction perpendicular to a plane where the optical device 2 is located. The "second region 2B" refers to a region surrounding the first region 2A.

It will be understood that as shown in FIG. 3A, the light-emitting side L of the display panel 1 is also a display side of the display panel 1, i.e., the side of the display assembly 4 configured to be proximate to the human eyes.

In the related art, a size of a display panel is less than a size of an optical device, which causes that the optical device receives light from a middle display region of the display panel more than light from a peripheral display region of the display panel. Referring to FIG. 2, the light emitted from the peripheral display region B at an angle greater than θ1 cannot be received by the optical device 2, resulting in that an intensity of the light from the peripheral display region received by the optical device 2 is less than an intensity of the light from the middle display region received by the optical device 2.

Figure 4:
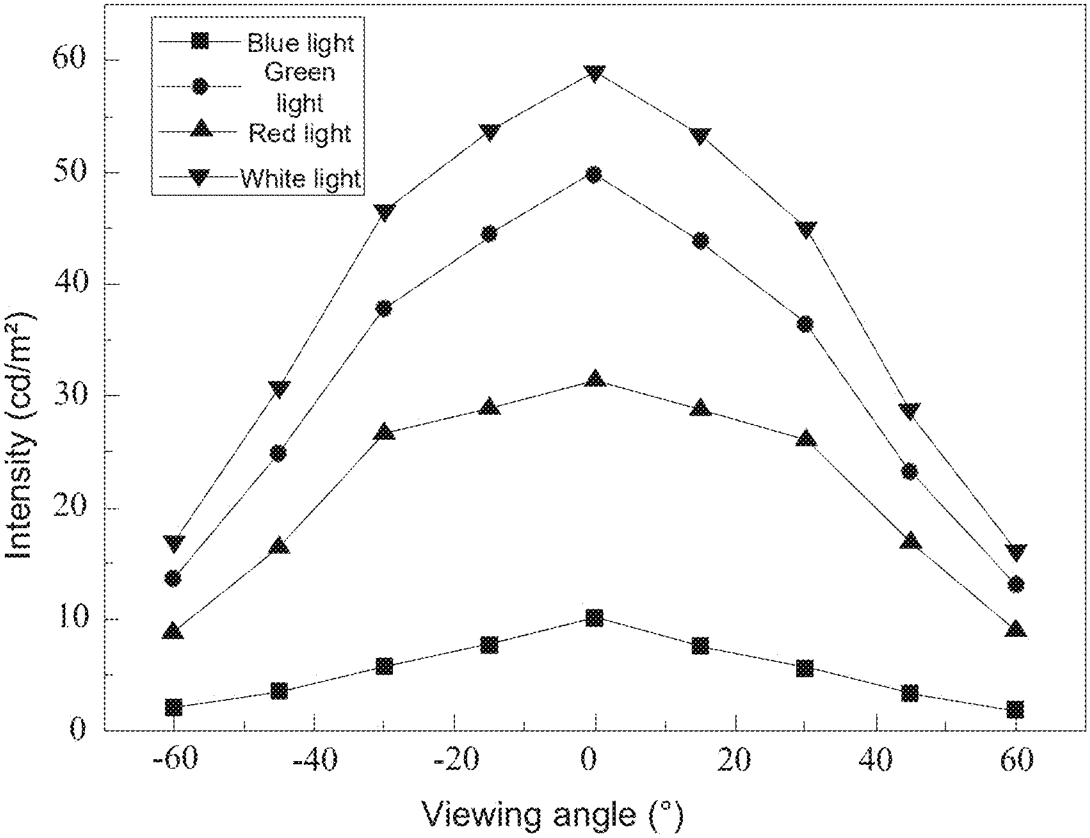
FIG. 4 is a curve graph showing a relationship between luminous intensity and viewing angle of a display assembly, in accordance with some embodiments of the present disclosure.

Moreover, it can be seen from FIG. 4 that intensities (L, unit cd/m$^2$) of light reaching the optical device are different at different viewing angles (unit °) of the display panel. The less the viewing angle is, the greater the intensity of light is; the greater the viewing angle is, the less the intensity of light is. Therefore, among the light received by the optical device, an intensity of light in a large viewing angle range is less than an intensity of light in a small viewing angle range.

As a result of the factors mentioned above, the human eyes observe that pictures of the display panel are uneven in luminance, for example, the pictures are bright in the middle and dark at the edge, which makes the display effect of the display panel poor.

In the above embodiments of the present disclosure, by providing the light adjusting layer 12 on the light-emitting side L of the display panel 1, among the light emitted from the peripheral display region B of the display panel 1, at least a portion of the light emitted to the first region 2A of the optical device 2 (e.g., a middle region of the optical device 2) and at least a portion of the light emitted to the outer side of the optical device 2 are deflected after passing through the light adjusting layer 12, and emitted to the second region 2B of the optical device 2. As a result, an amount of light received by the second region 2B of the optical device 2 (e.g., a peripheral region of the optical device 2) is increased, and an intensity of the light received by the second region 2B of the optical device 2 is increased, thereby reducing the difference between the intensity of the light received by the second region 2B of the optical device 2 and an intensity of light received by the first region 2A of the optical device 2, reducing the difference between intensities of light transmitted from different regions of the optical device 2 to the human eyes, improving the luminance uniformity of the pictures seen by the human eyes 3 and improving the display effect of the display panel 1.

Figure 5A:
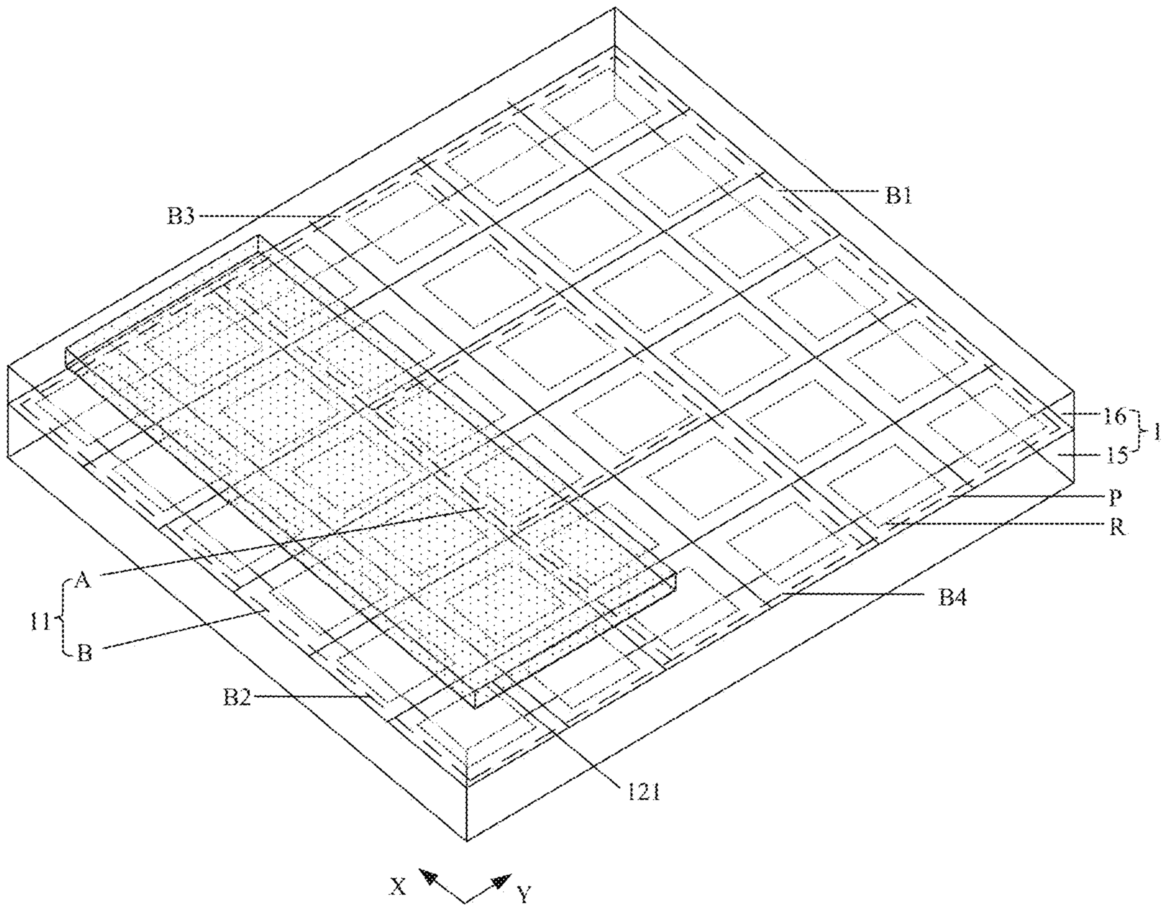
FIG. 5A is a structural diagram of another display assembly, in accordance with some embodiments of the present disclosure.

In some embodiments, as shown in FIG. 5A, the peripheral display region B includes a first sub-region B1 and a second sub-region B2 located on opposite sides of the middle display region A in the first direction Y, and a third sub-region B3 and a fourth sub-region B4 located on opposite sides of the middle display region A in the second direction X. The first direction Y intersects with the second direction X, for example, the first direction Y is perpendicular to the second direction X, and for example, the first direction Y is a column direction of the display panel 1 and the second direction X is a row direction of the display panel 1.

It will be noted that the first sub-region B1, the second sub-region B2, the third sub-region B3 and the fourth sub-region B4 are non-overlapping with each other.

For example, as shown in FIG. 5A, the first sub-region B1, the second sub-region B2, the third sub-region B3 and the fourth sub-region B4 may be arranged in the manner shown in the figure, and these four sub-regions are connected together to form the peripheral display region B.

For example, as shown in FIG. 5A, a ratio of an area of the first sub-region B1 to an area of the display region 11 is less than or equal to one third; and a ratio of an area of the second sub-region B2 to the area of the display region 11 is less than or equal to one third. For example, the ratio of the area of the first sub-region B1 to the area of the display region 11 is equal to one third; and the ratio of the area of the second sub-region B2 to the area of the display region 11 is equal to one third.

The light adjusting layer 12 includes at least one light adjusting unit 121, and the light adjusting unit 121 is distributed in at least one of the first sub-region B1, the second sub-region B2, the third sub-region B3 and the fourth sub-region B4.

For example, as shown in FIG. 5A, the light adjusting layer 12 includes a single light adjusting unit 121, and the light adjusting unit 121 may be distributed in the second sub-region B2.

For example, the light adjusting layer 12 includes a single light adjusting unit 121, and the light adjusting unit 121 may be distributed in the first sub-region B1.

For example, the light adjusting layer 12 includes a single light adjusting unit 121, and the light adjusting unit 121 may be distributed in the third sub-region B3.

For example, the light adjusting layer 12 includes a single light adjusting unit 121, and the light adjusting unit 121 may be distributed in the fourth sub-region B4.

The light adjusting unit 121 is configured to: deflect at least a portion of light emitted to the first region 2A of the optical device 2 and at least a portion of light emitted to the outer side of the optical device 2 among light emitted from the sub-region where the light adjusting unit 121 is located, after passing through the light adjusting unit 121; and emit the deflected light to the second region 2B of the optical device 2. As a result, the amount of light received by the second region 2B of the optical device 2 is increased, and the intensity of the light received by the second region 2B of the optical device 2 is increased, thereby reducing the difference between the intensity of the light received by the second region 2B of the optical device 2 and the intensity of the light received by the first region 2A of the optical device 2, reducing the difference between the intensities of the light transmitted from different regions of the optical device 2 to the human eyes, and improving the luminance uniformity of the pictures seen by the human eyes 3.

Figure 5B:
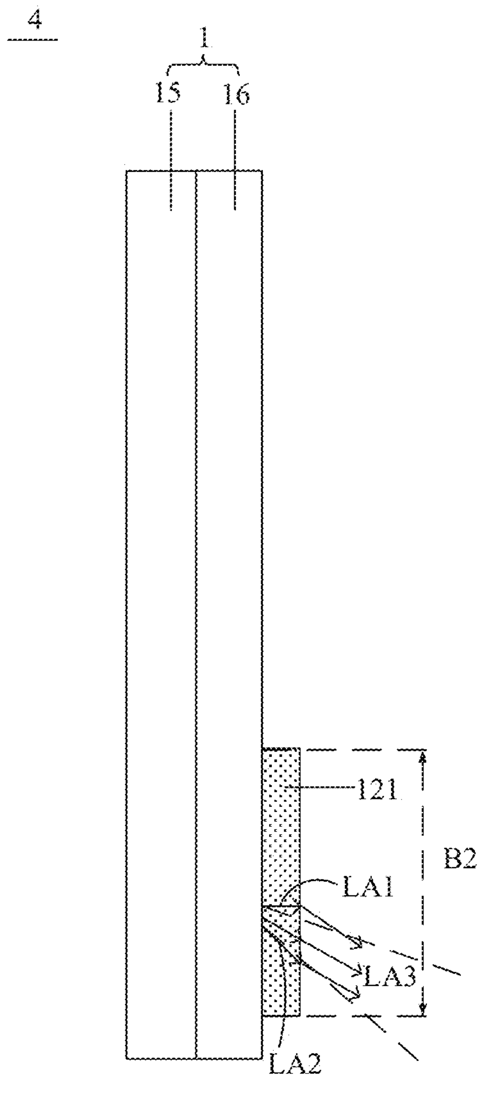
FIG. 5B is a side view of the display assembly in FIG. 5A.
Figure 6:
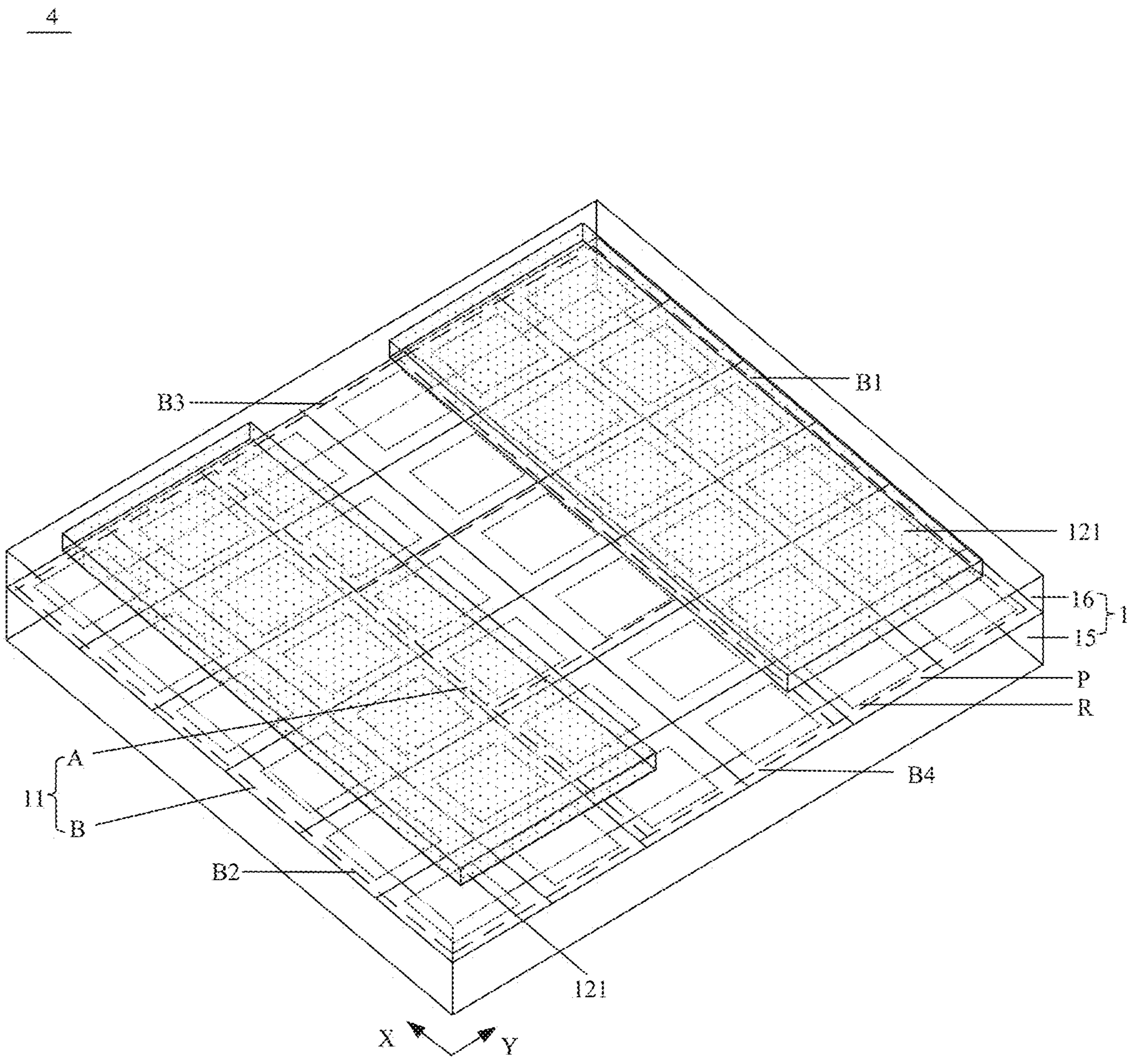
FIG. 6 is a structural diagram of yet another display assembly, in accordance with some embodiments of the present disclosure.

For example, as shown in FIG. 5B, the light adjusting unit 121 deflects at least a portion of light emitted to the first region 2A of the optical device 2 (as indicated by the arrowed line LA1 in FIG. 5B) and at least a portion of light emitted to the outer side of the optical device 2 (as indicated by the arrowed line LA2 in FIG. 5B) among light emitted from the second sub-region B2 after passing through the light adjusting unit 121, and emits the deflected light to the second region 2B of the optical device 2 (as indicated by the arrowed lines LA3 in FIG. 5B).

Figure 7A:
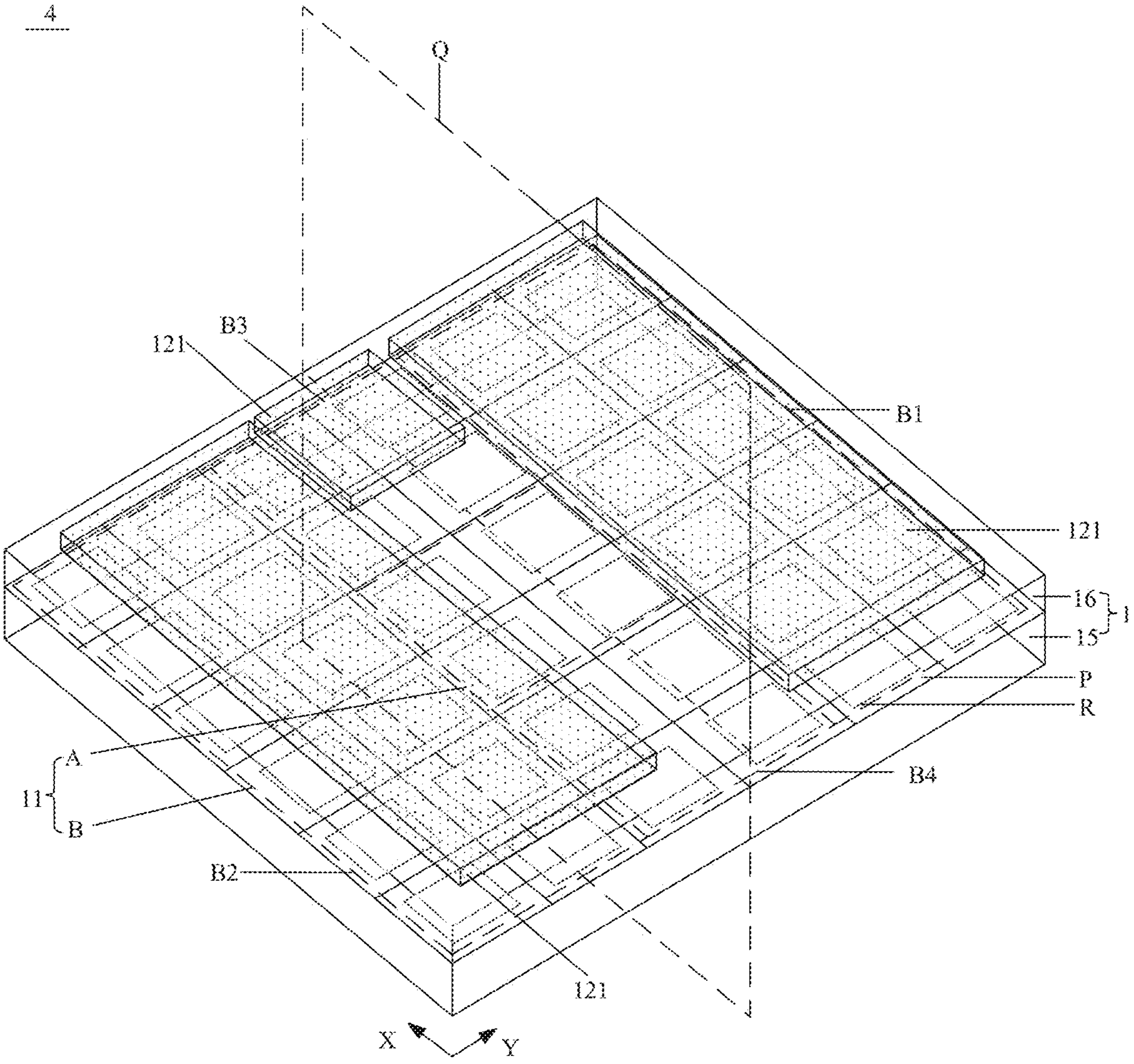
FIG. 7A is a structural diagram of yet another display assembly, in accordance with some embodiments of the present disclosure.
Figure 7B:
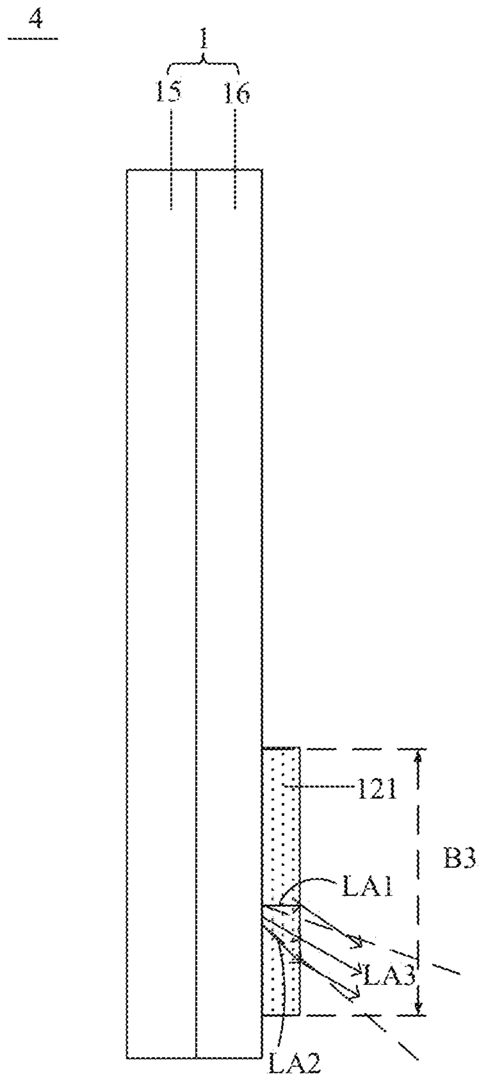
FIG. 7B is a cross-sectional view of the display assembly in FIG. 7A taken along the plane Q.

As shown in FIG. 7A, the light adjusting layer 12 includes three light adjusting units 121, and the three light adjusting units 121 may be distributed in the first sub-region B1, the second sub-region B2 and the third sub-region B3. For example, FIG. 7B shows a cross-sectional view of the display assembly 4 in FIG. 7A taken along the plane Q, and the light adjusting unit 121 deflects at least a portion of light emitted to the first region 2A of the optical device 2 (as indicated by the arrowed line LA1 in FIG. 7B) and at least a portion of light emitted to the outer side of the optical device 2 (as indicated by the arrowed line LA2 in FIG. 7B) among light emitted from the third sub-region B3 after passing through the light adjusting unit 121, and emits the deflected light to the second region 2B of the optical device 2 (as indicated by the arrowed lines LA3 in FIG. 7B).

Figure 8A:
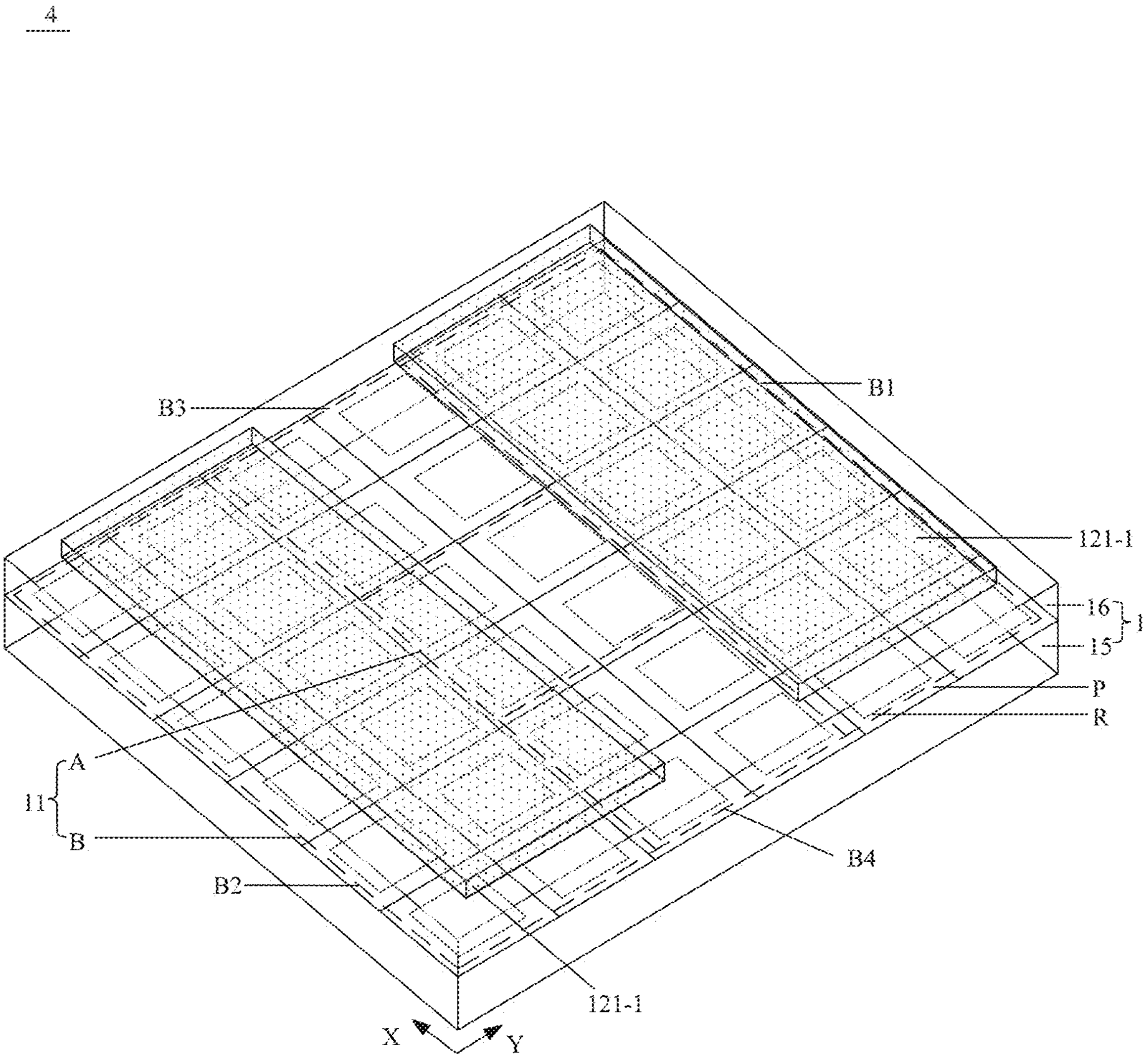
FIG. 8A is a structural diagram of yet another display assembly, in accordance with some embodiments of the present disclosure.

In some embodiments, as shown in FIG. 8A, the light adjusting layer 12 includes two first light adjusting units 121-1, and the two first light adjusting units 121-1 are distributed in the first sub-region B1 and the second sub-region B2, so that among light emitted from the first sub-region B1 and the second sub-region B2, at least a portion of light emitted to the first region 2A of the optical device 2 and at least a portion of light emitted to the outer side of the optical device 2 are deflected after passing through the first light adjusting units 121-1, and emitted to the second region 2B of the optical device 2. As a result, in the first direction Y, the amount of light received by the second region 2B of the optical device 2 is increased, and the intensity of the light received by the second region 2B of the optical device 2 is increased, thereby reducing the difference between the intensity of the light received by the second region 2B of the optical device 2 and the intensity of the light received by the first region 2A of the optical device 2, reducing the difference between the intensities of the light transmitted from different regions of the optical device 2 to the human eyes, and improving the luminance uniformity of the pictures in the first direction Y.

Figure 8B:
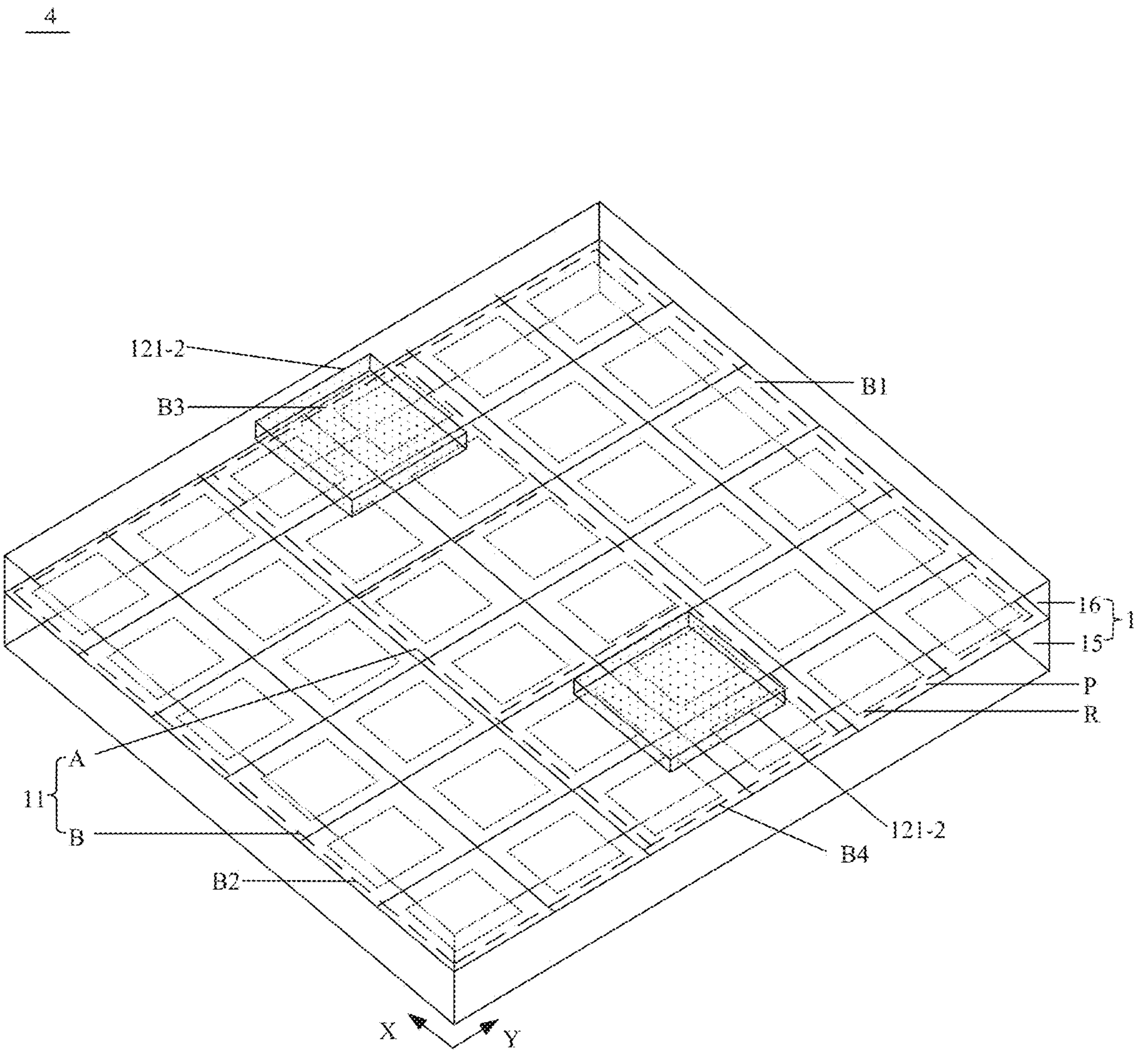
FIG. 8B is a structural diagram of yet another display assembly, in accordance with some embodiments of the present disclosure.

In some embodiments, as shown in FIG. 8B, the light adjusting layer 12 includes two second light adjusting units 121-2, and the two second light adjusting units 121-2 are distributed in the third sub-region B3 and the fourth sub-region B4, so that among light emitted from the third sub-region B3 and the fourth sub-region B4, at least a portion of light emitted to the first region 2A of the optical device 2 and at least a portion of light emitted to the outer side of the optical device 2 are deflected after passing through the second light adjusting units 121-2, and emitted to the second region 2B of the optical device 2. As a result, in the second direction X, the amount of light received by the second region 2B of the optical device 2 is increased, and the intensity of the light received by the second region 2B of the optical device 2 is increased, thereby reducing the difference between the intensity of the light received by the second region 2B of the optical device 2 and the intensity of the light received by the first region 2A of the optical device 2, reducing the difference between the intensities of the light transmitted from different regions of the optical device 2 to the human eyes, and improving the luminance uniformity of the pictures in the second direction X.

Figure 8C:
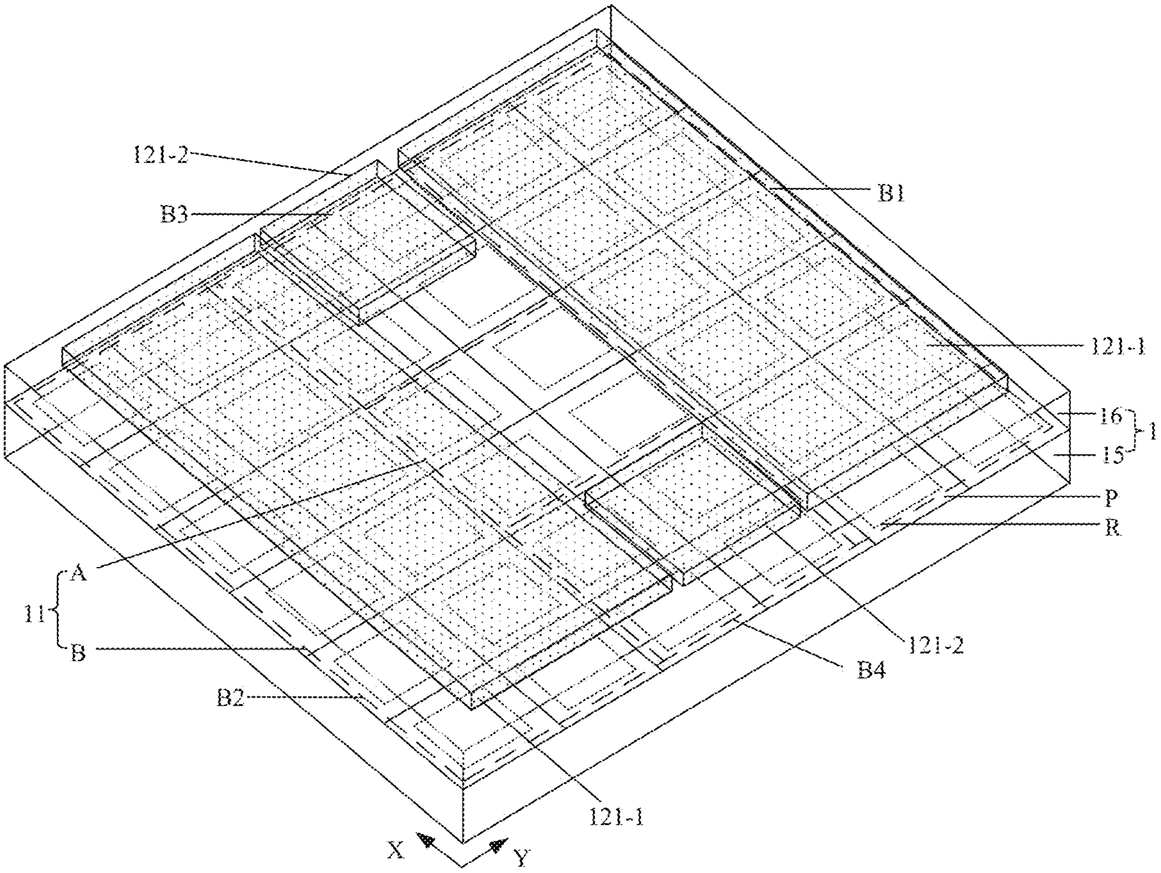
FIG. 8C is a structural diagram of yet another display assembly, in accordance with some embodiments of the present disclosure.

In some embodiments, as shown in FIG. 8C, the light adjusting layer 12 includes two first light adjusting units 121-1, and the two first light adjusting units 121-1 are distributed in the first sub-region B1 and the second sub-region B2. Moreover, the light adjusting layer 12 further includes two second light adjusting units 121-2, and the two second light adjusting units 121-2 are distributed in the third sub-region B3 and the fourth sub-region B4. With the above arrangement, the luminance uniformity of the pictures in the first direction Y and the second direction X may be improved.

Figure 9A:
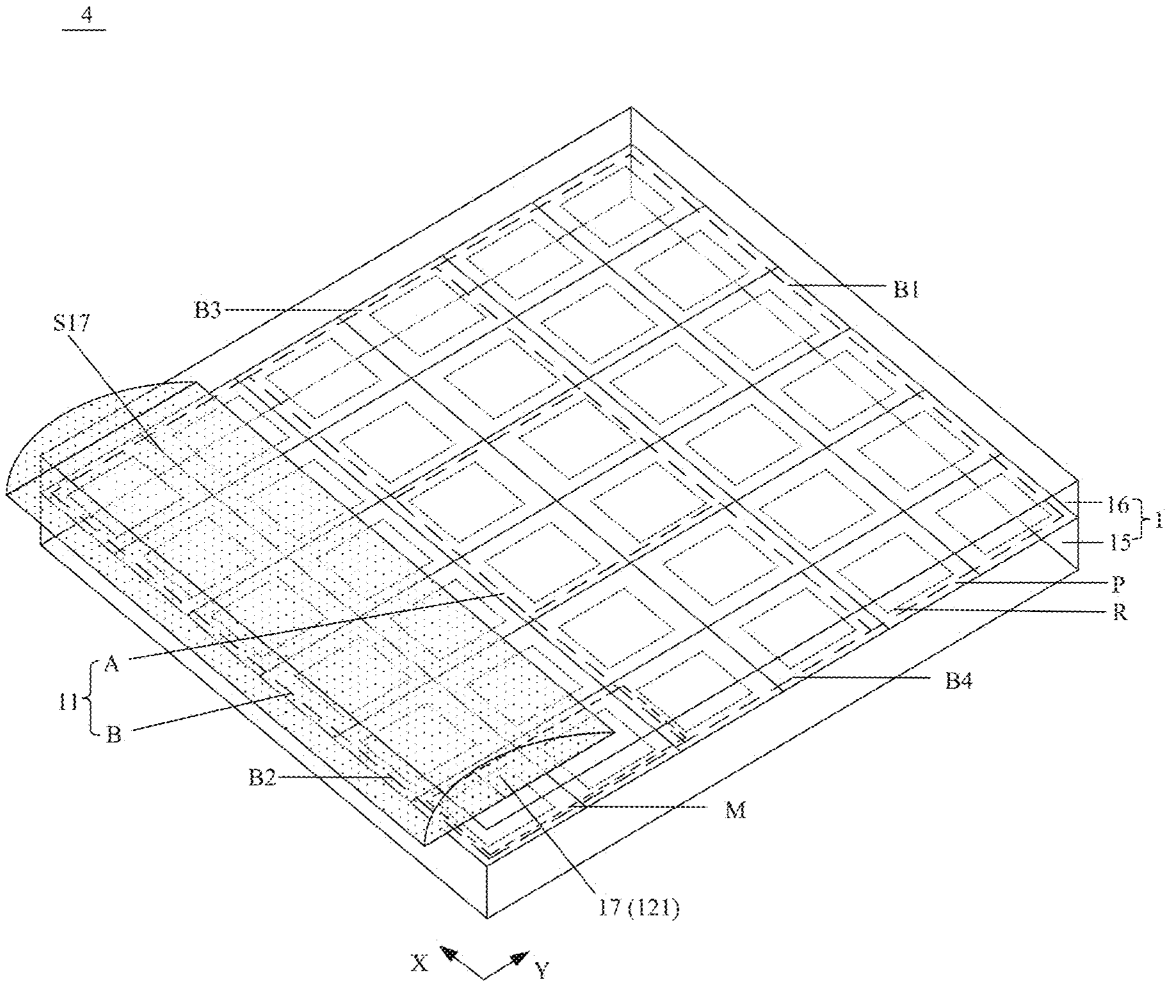
FIG. 9A is a structural diagram of yet another display assembly, in accordance with some embodiments of the present disclosure.

In some embodiments, as shown in FIG. 9A, the display panel 1 includes a plurality of sub-pixels P arranged in the display region 11, and each sub-pixel P has an opening region R.

For example, the plurality of sub-pixels P at least include sub-pixels with a first color, sub-pixels with a second color and sub-pixels with a third color, and the first color, the second color and the third color are three primary colors (e.g., red, green and blue). FIG. 9A shows an example in which the plurality of sub-pixels P are arranged in an array.

Figure 9B:
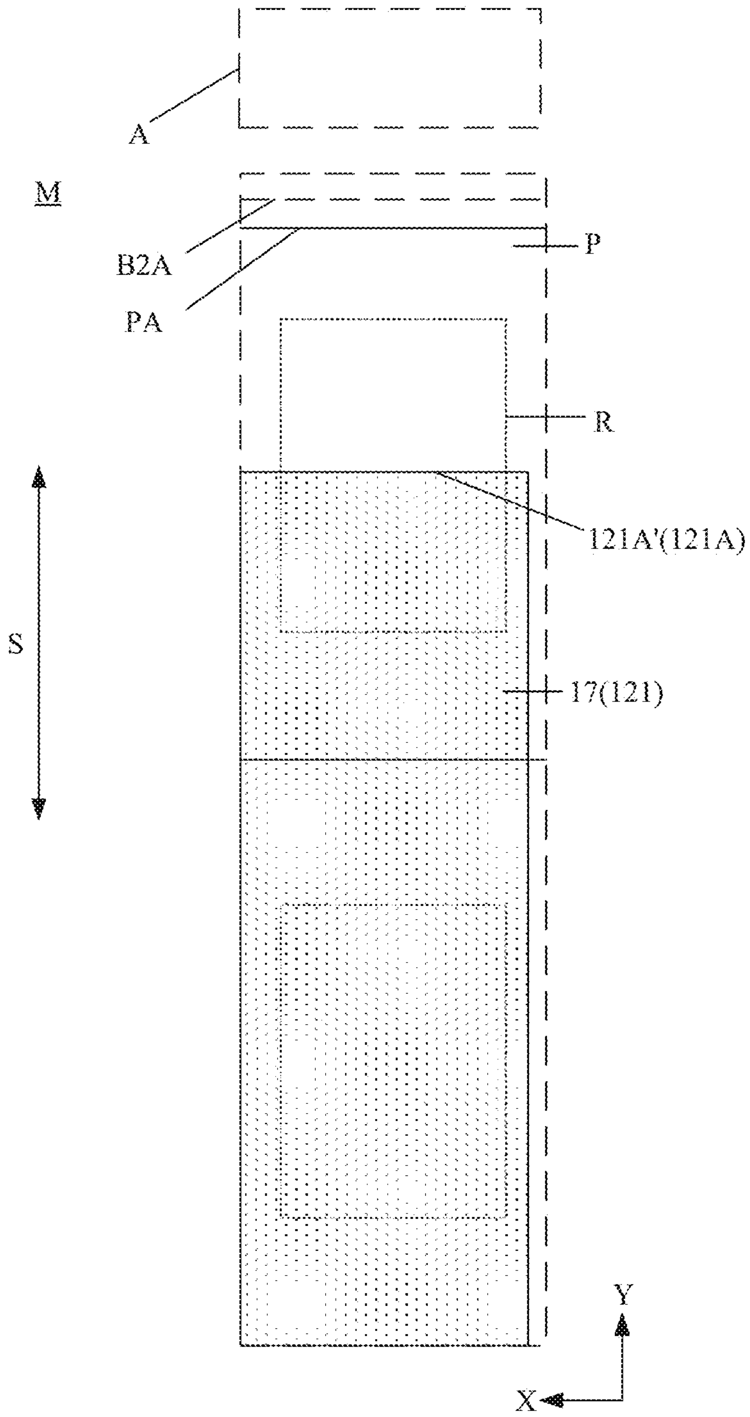
FIG. 9B is a top view of part M of the display assembly in FIG. 9A.
Figure 9C:
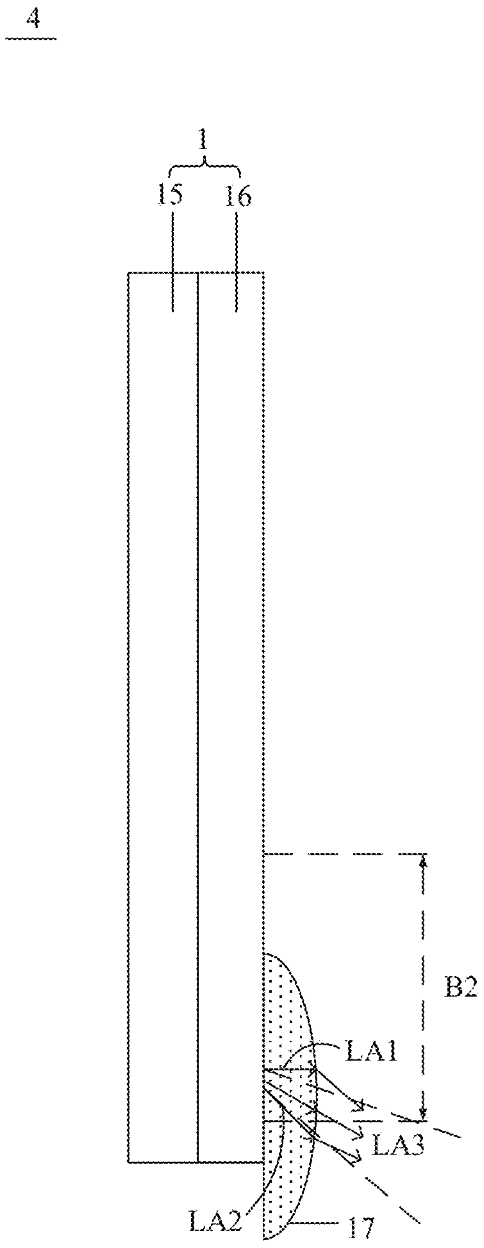
FIG. 9C is a side view of the display assembly in FIG. 9A.
Figure 9D:
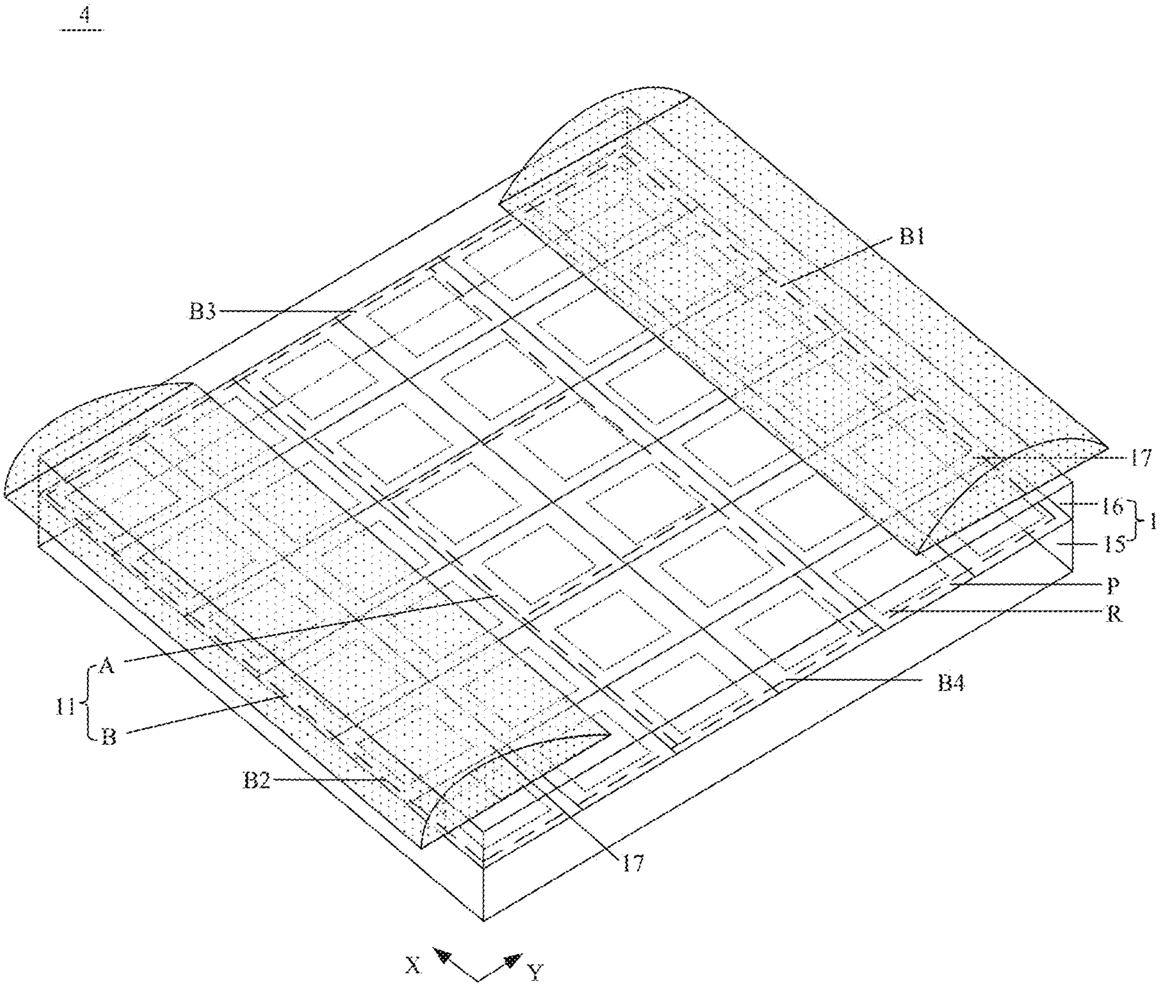
FIG. 9D is a structural diagram of yet another display assembly, in accordance with some embodiments of the present disclosure.

As shown in FIGS. 9A and 9D, the light adjusting unit 121 includes at least one lens 17, each lens 17 corresponds to at least one sub-pixel P disposed in a sub-region where the light adjusting unit 121 is located, and an orthographic projection of each lens 17 on the display panel 1 at least partially overlaps with an opening region R of the at least one sub-pixel P corresponding thereto. Through the lens 17, among light emitted from the sub-pixel P corresponding the lens 17, at least a portion of light emitted to the first region 2A of the optical device 2 and at least a portion of light emitted to the outer side of the optical device 2 are deflected after passing through the lens 17, and emitted to the second region 2B of the optical device 2. As a result, the amount of light received by the second region 2B of the optical device 2 is increased, and the intensity of the light received by the second region 2B of the optical device 2 is increased.

For example, as shown in FIG. 9A, the light adjusting unit 121 includes a single lens 17, the lens 17 corresponds to a plurality of sub-pixels P in the second sub-region B2, and an orthographic projection of the lens 17 on the display panel 1 at least partially overlaps with opening regions R of the plurality of sub-pixels P corresponding thereto.

As shown in FIG. 9C, through the lens 17, among light emitted from the plurality of sub-pixels P in the second sub-region B2, at least a portion of light emitted to the first region 2A of the optical device 2 (as indicated by the arrowed line LA1 in FIG. 9C) and at least a portion of light emitted to the outer side of the optical device 2 (as indicated by the arrowed line LA2 in FIG. 9C) are deflected after passing through the lens 17, and emitted to the second region 2B of the optical device 2 (as indicated by the arrowed line3 LA3 in FIG. 9C).

For example, the light adjusting unit 121 includes a single lens 17, the lens 17 corresponds to a plurality of sub-pixels P in the first sub-region B1 or the third sub-region B3 or the fourth sub-region B4, and an orthographic projection of the lens 17 on the display panel 1 at least partially overlaps with opening regions R of the sub-pixels P corresponding thereto.

For example, as shown in FIG. 9D, the light adjusting unit 121 includes a single lens 17, that is, the light adjusting layer 12 has two lenses 17, the two lenses 17 correspond to a plurality of sub-pixels P in the first sub-region B1 and a plurality of sub-pixels P in the second sub-region B2; and orthographic projections of the two lenses 17 on the display panel 1 at least partially overlap with opening regions R of the pluralities of sub-pixels P corresponding thereto.

Figure 9E:
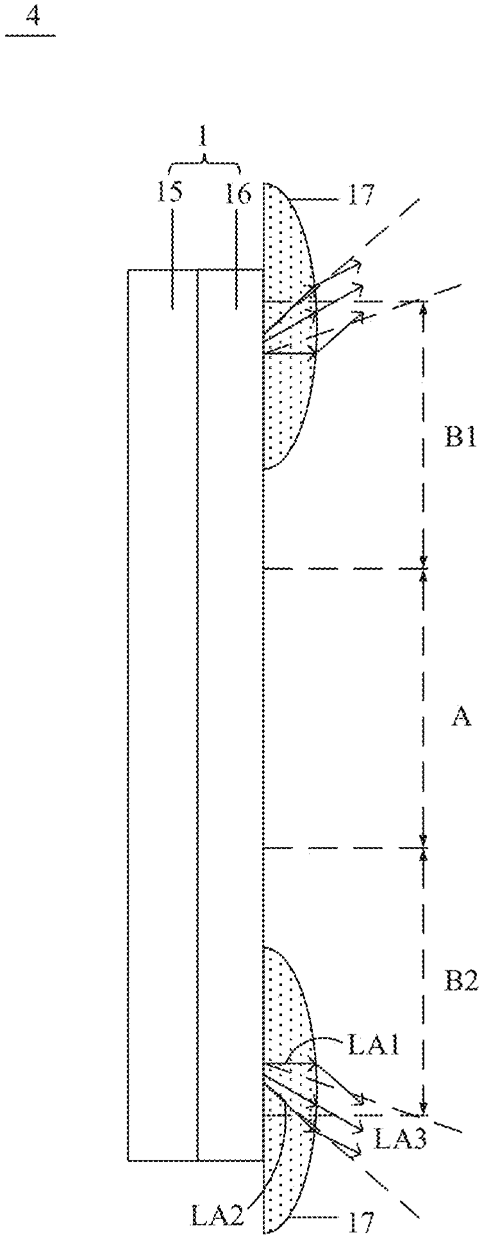
FIG. 9E is a side view of the display assembly in FIG. 9D.

As shown in FIG. 9E, through the two lenses 17, among light emitted from the pluralities of sub-pixels P in the first sub-region B1 and the second sub-region B2, at least a portion of light emitted to the first region 2A of the optical device 2 (as indicated by the arrowed line LA1 in FIG. 9E) and at least a portion of light emitted to the outer side of the optical device 2 (as indicated by the arrowed line LA2 in FIG. 9E) are deflected after passing through the lenses 17, and emitted to the second region 2B of the optical device 2 (as indicated by the arrowed lines LA3 in FIG. 9E).

For example, the light adjusting unit 121 includes a single lens 17, that is, the light adjusting layer 12 has two lenses 17, and the two lenses 17 correspond to a plurality of sub-pixels P in the third sub-region B3 and a plurality of sub-pixels P in the fourth sub-region B4; and orthographic projections of the two lenses 17 on the display panel 1 at least partially overlap with opening regions R of the pluralities of sub-pixels P corresponding thereto.

In addition, in some embodiments, as shown in FIGS. 10A to 10D, the light adjusting unit 121 includes a plurality of lenses 17, the plurality of lenses 17 are arranged in an array. Each lens 17 corresponds to at least one sub-pixel disposed in a sub-region where the light adjusting unit 121 is located, and an orthographic projection of each lens 17 on the display panel 1 at least partially overlaps with an opening region R of the at least one sub-pixel P corresponding thereto. As shown in FIG. 100, through the lens 17, among light emitted from the at least one sub-pixel P corresponding the lens 17, at least a portion of light emitted to the first region 2A of the optical device 2 (as indicated by the arrowed line LA1 in FIG. 100) and at least a portion of light emitted to the outer side of the optical device 2 (as indicated by the arrowed line LA2 in FIG. 100) are deflected after passing through the lens 17, and emitted to the second region 2B of the optical device 2 (as indicated by the arrowed lines LA3 in FIG. 100).

Figure 10A:
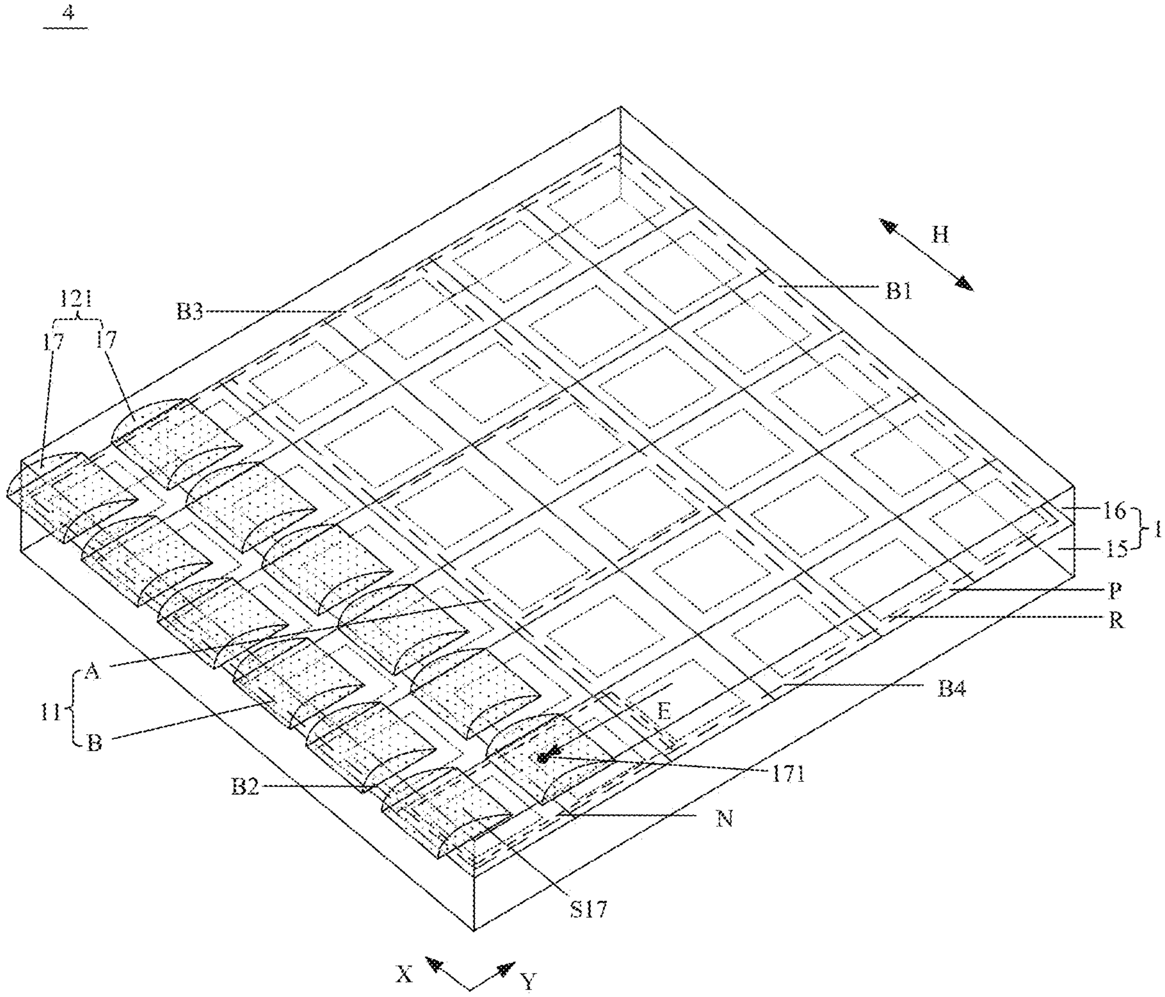
FIG. 10A is a structural diagram of yet another display assembly, in accordance with some embodiments of the present disclosure.

For example, as shown in FIG. 10A, the plurality of lenses 17 are distributed in the second sub-region B2, each lens 17 corresponds to at least one sub-pixel P disposed in the second sub-region B2, and an orthographic projection of each lens 17 on the display panel 1 at least partially overlaps with an opening region R of the at least one sub-pixel P corresponding thereto.

Figure 10B:
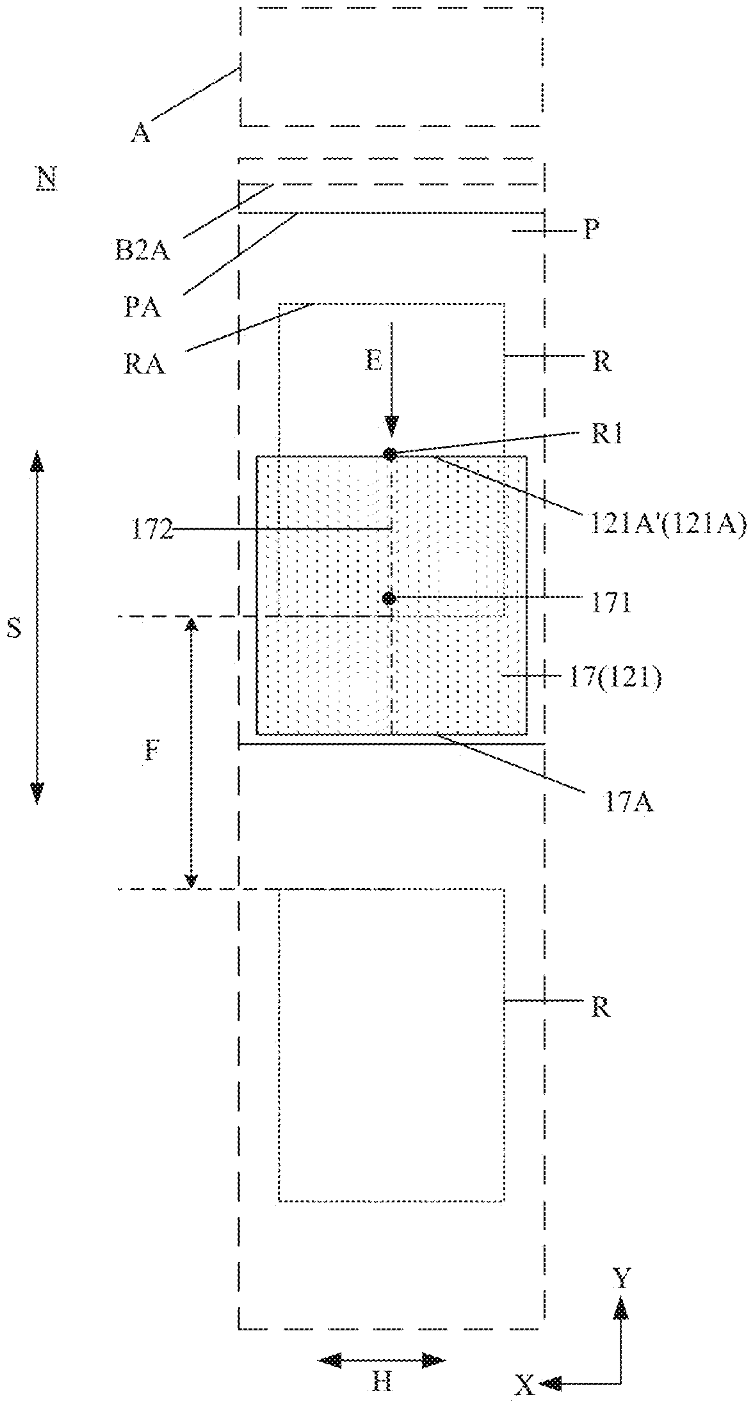
FIG. 10B is a top view of part N of the display assembly in FIG. 10A.
Figure 10C:
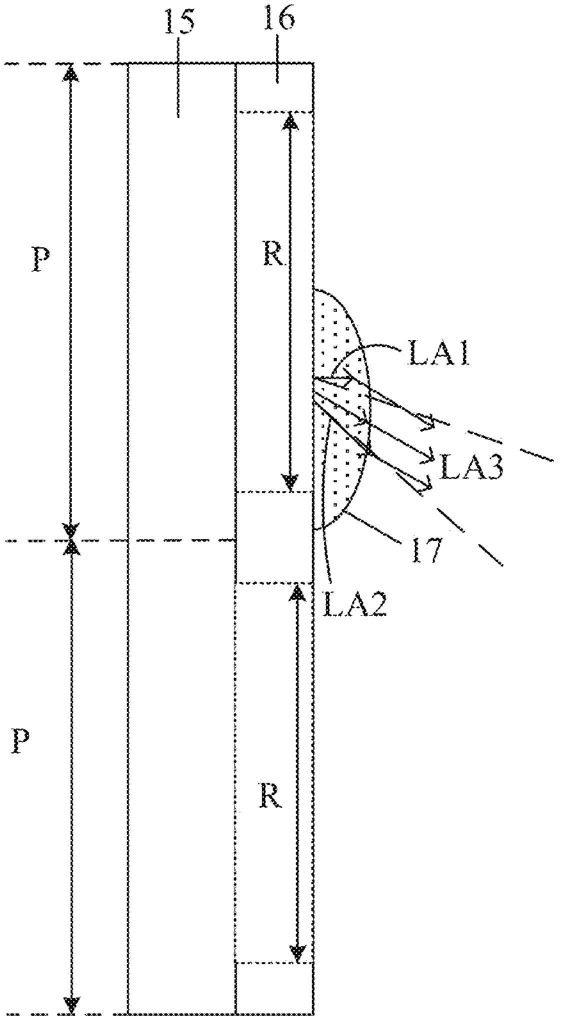
FIG. 10C is a side view of part N of the display assembly in FIG. 10A.
Figure 10D:
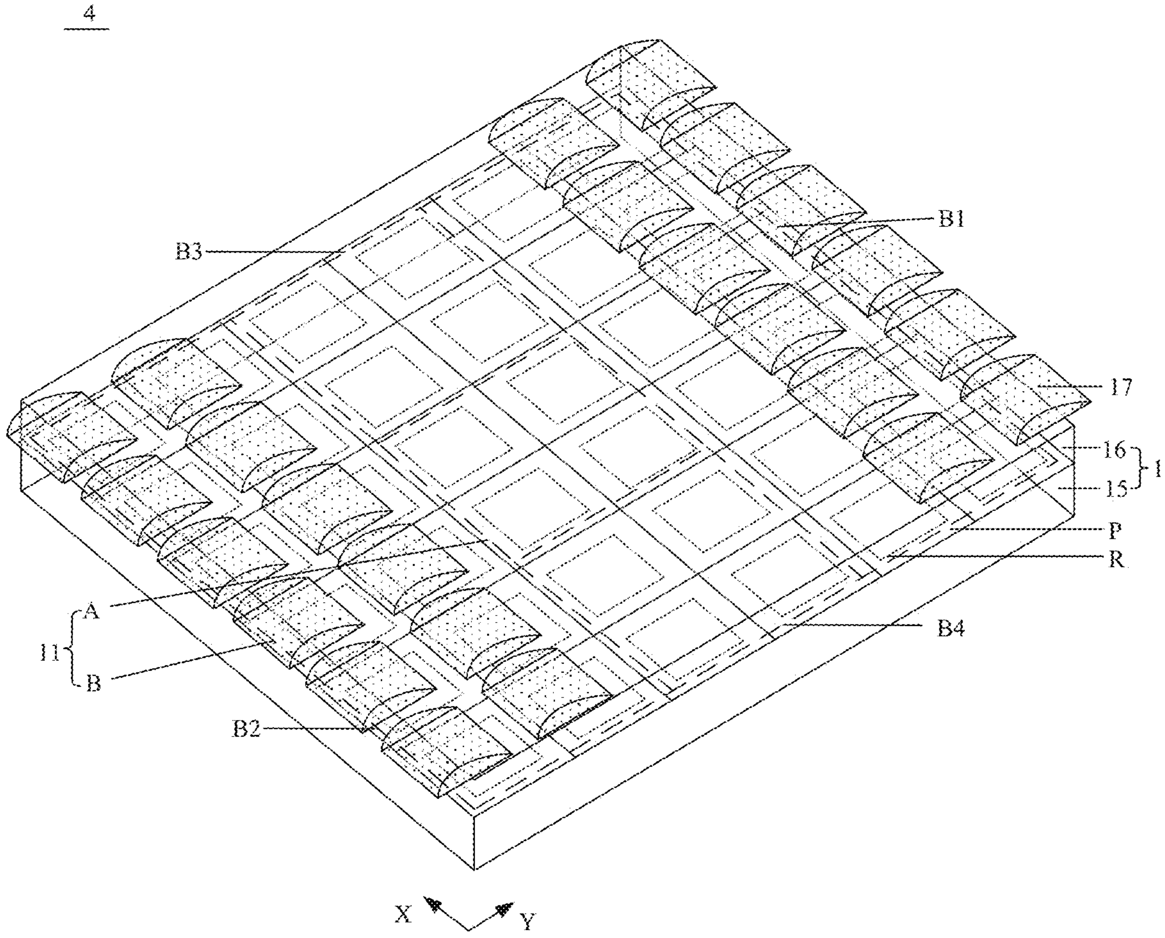
FIG. 10D is a structural diagram of yet another display assembly, in accordance with some embodiments of the present disclosure.

For example, as shown in FIG. 10D, the pluralities of lenses 17 are distributed in the first sub-region B1 and the second sub-region B2, and each lens 17 corresponds to at least one sub-pixel P in the first sub-region B1 or the second sub-region B2, and an orthographic projection of each lens 17 on the display panel 1 at least partially overlaps with an opening region R of the at least one sub-pixel P corresponding thereto.

In some embodiments, as shown in FIGS. 9A, 10A and 10D, sub-pixels P corresponding to different lenses 17 are different, that is, any two lenses 17 do not correspond to the same sub-pixel or sub-pixels P. Through different lenses 17, among light emitted from the sub-pixels P corresponding to the lenses 17, at least a portion of light emitted to the first region 2A of the optical device 2 and at least a portion of light emitted to the outer side of the optical device 2 are deflected after passing through the lenses 17, and emitted to the second region 2B of the optical device 2.

In some embodiments, as shown in FIGS. 9B and 10B, in a plane direction S of the display panel 1, a border 121A of the light adjusting unit 121 proximate to the middle display region A is farther away from the middle display region A than a border of a sub-region where the light adjusting unit 121 is located proximate to the middle display region A.

It will be understood that the light adjusting unit 121 and the sub-pixel P are disposed in a staggered manner, and the light adjusting unit 121 is offset in a direction away from the middle display region A relative to the sub-region where the light adjusting unit 121 is located.

For example, as shown in FIGS. 9B and 10B, in the plane direction S of the display panel 1, the border 121A of the light adjusting unit 121 proximate to the middle display region A is farther away from the middle display region A than a border B2A of the second sub-region B2 where the light adjusting unit 121 is located proximate to the middle display region A.

In some embodiments, as shown in FIGS. 9B and 10B, in the plane direction S of the display panel 1, a border 121A' of the lens 17 proximate to the middle display region A is farther away from the middle display region A than a border PA of a region that is determined by the at least one sub-pixel P corresponding thereto proximate to the middle display region A.

It will be understood that the lens 17 and the region that is determined by the at least one sub-pixel P corresponding thereto are disposed in a staggered manner.

For example, as shown in FIG. 9B, in the plane direction S of the display panel 1, the border 121A' of the lens 17 proximate to the middle display region A is farther away from the middle display region A than a border PA of a region that is determined by the plurality of sub-pixels P corresponding thereto proximate to the middle display region A.

For example, as shown in FIG. 10B, in the plane direction S of the display panel 1, the border 121A' of the lens 17 proximate to the middle display region A is farther away from the middle display region A than a border PA of a region determined by the sub-pixel P corresponding thereto proximate to the middle display region A.

In some embodiments, as shown in FIGS. 10A and 10B, in a case where the light adjusting unit 121 includes the plurality of lenses 17, each lens 17 corresponds to a single sub-pixel P, and an orthographic projection of each lens 17 on the display panel 1 partially overlaps with an opening region R of the sub-pixel P corresponding thereto.

In the plane direction S of the display panel 1, the border 121A' of the lens 17 proximate to the middle display region A is farther away from the middle display region A than a border RA of the opening region R of the sub-pixel P corresponding thereto proximate to the middle display region A.

In some embodiments, as shown in FIGS. 10A and 10B, in a direction H parallel to a border of the middle display region A proximate to the lens 17, a dimension of the lens 17 is greater than a dimension of the opening region R of the sub-pixel P corresponding thereto. Therefore, in the direction H parallel to the border of the middle display region A proximate to the lens 17, most or all of light emitted by the sub-pixel P may be deflected through the lens 17 corresponding to the sub-pixel P.

In some embodiments, as shown in FIGS. 10A and 10B, in the plane direction S of the display panel 1 and in a symmetric line 172 of a surface of the lens 17 facing the display panel 1, and along a direction E from the middle display region A to the lens 17, a border 17A of the lens 17 away from the middle display region A is located in a space region F between the opening region R of the sub-pixel P corresponding thereto and an opening region R of a sub-pixel P adjacent to the sub-pixel P.

With the above arrangement, connection or overlap between two adjacent lenses 17 may be avoided to ensure that the lenses 17 are independent from each other.

In some embodiments, as shown in FIG. 10B, a center 171 of the lens 17 is farther away from the middle display region A of the display panel A than a center R1 of the opening region R of the sub-pixel P corresponding thereto.

It will be understood that the lens 17 and the opening area R of the sub-pixel P corresponding thereto are disposed in a staggered manner.

In some embodiments, as shown in FIGS. 9A and 10A, a surface S17 of the lens 17 away from the display panel 1 includes a curved surface convex relative to the display panel 1.

It will be understood that, compared with a case where the surface of the lens 17 away from the display panel 1 is a plane, in a case where a portion of light emitted from the display panel 1 is incident onto the curved surface of the lens 17, an incident angle of the light is reduced, which may reduce total reflection of light at an interface between the curved surface of the lens 17 and the outside, thereby improving a transmittance of the light and increasing an intensity of light emitted from the display assembly 4.

In some embodiments, the surface of the lens 17 away from the display panel 1 includes at least one of a spherical surface, an ellipsoidal surface, a cambered surface and a sawtooth surface.

Figure 11A:
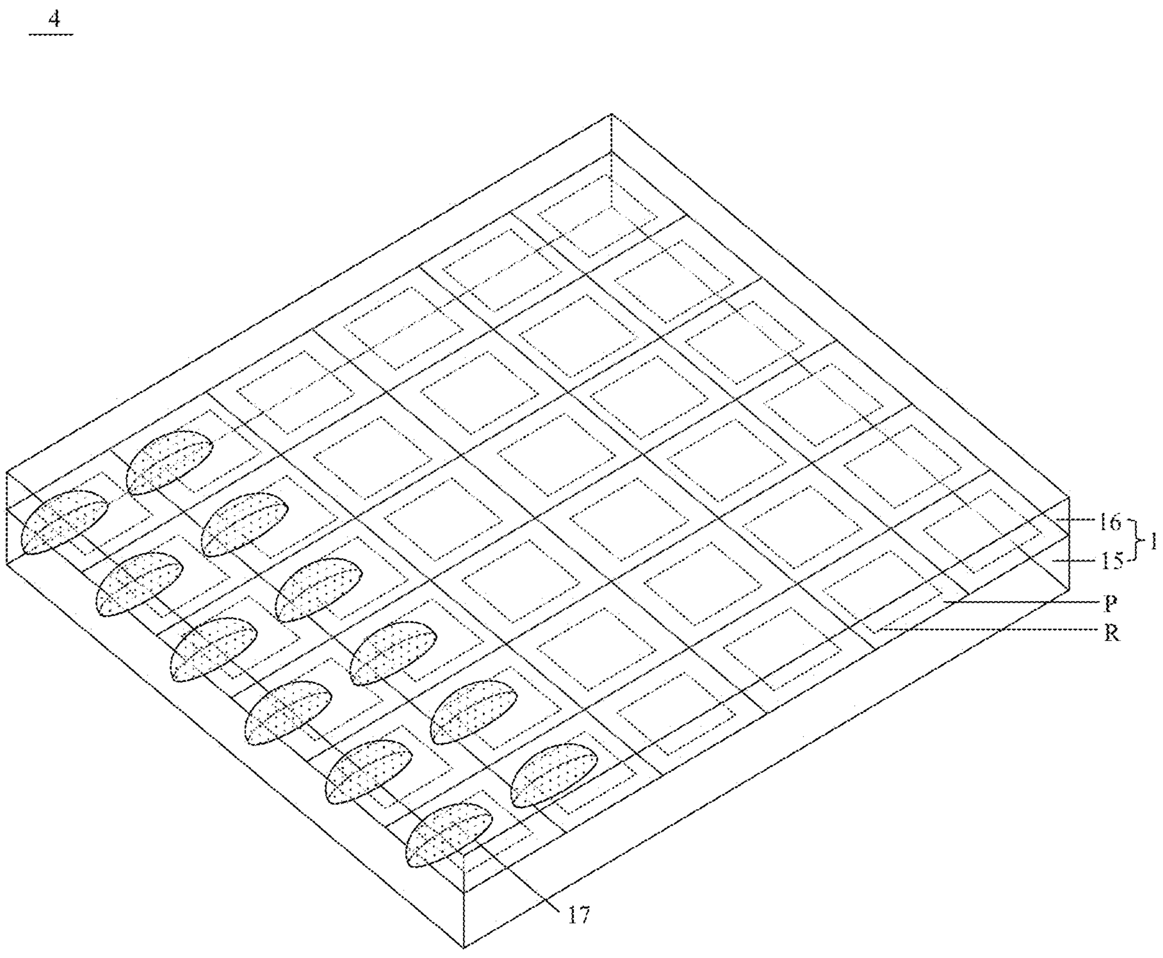
FIG. 11A is a structural diagram of yet another display assembly, in accordance with some embodiments of the present disclosure.
Figure 11B:
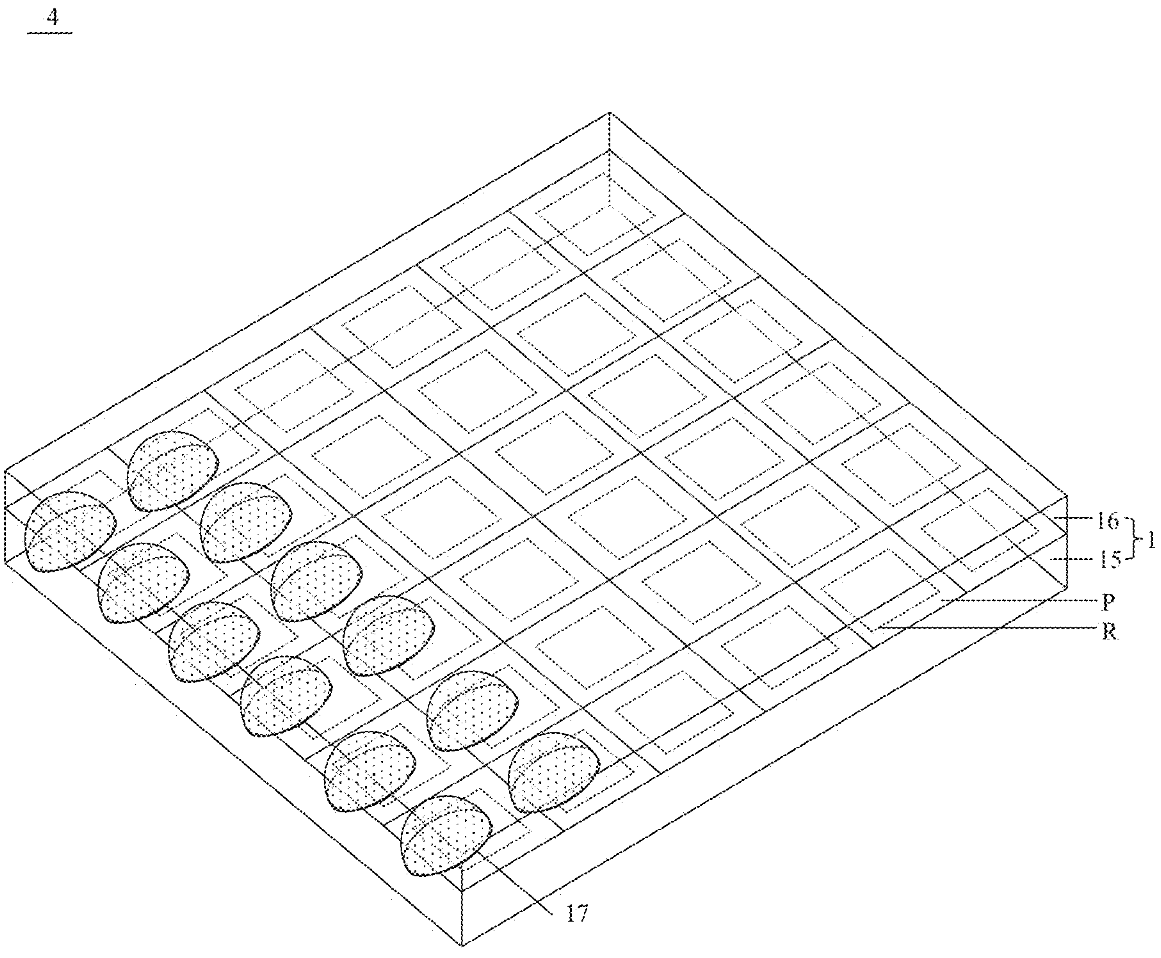
FIG. 11B is a structural diagram of yet another display assembly, in accordance with some embodiments of the present disclosure.

In some embodiments, as shown in FIGS. 9A and 10A, a shape of the orthographic projection of the lens 17 on the display panel 1 is a rectangle. As shown in FIG. 11A, the shape of the orthographic projection of the lens 17 on the display panel 1 is an ellipse. Or as shown in FIG. 11B, the shape of the orthographic projection of the lens 17 on the display panel 1 is a circle.

In the above embodiments, the difference between the intensity of the light received by the second region 2B of the optical device 2 and the intensity of the light received by the first region 2A of the optical device 2 is reduced by increasing the intensity of the light received by the second region 2B of the optical device 2. In some other embodiments, the difference between the intensity of the light received by the second region 2B of the optical device 2 and the intensity of the light received by the first region 2A of the optical device 2 may also be reduced by reducing the intensity of the light received by the first region 2A, for example, by reducing an area of the opening region R of the sub-pixel P in the middle display region A of the display panel 1.

Figure 12:
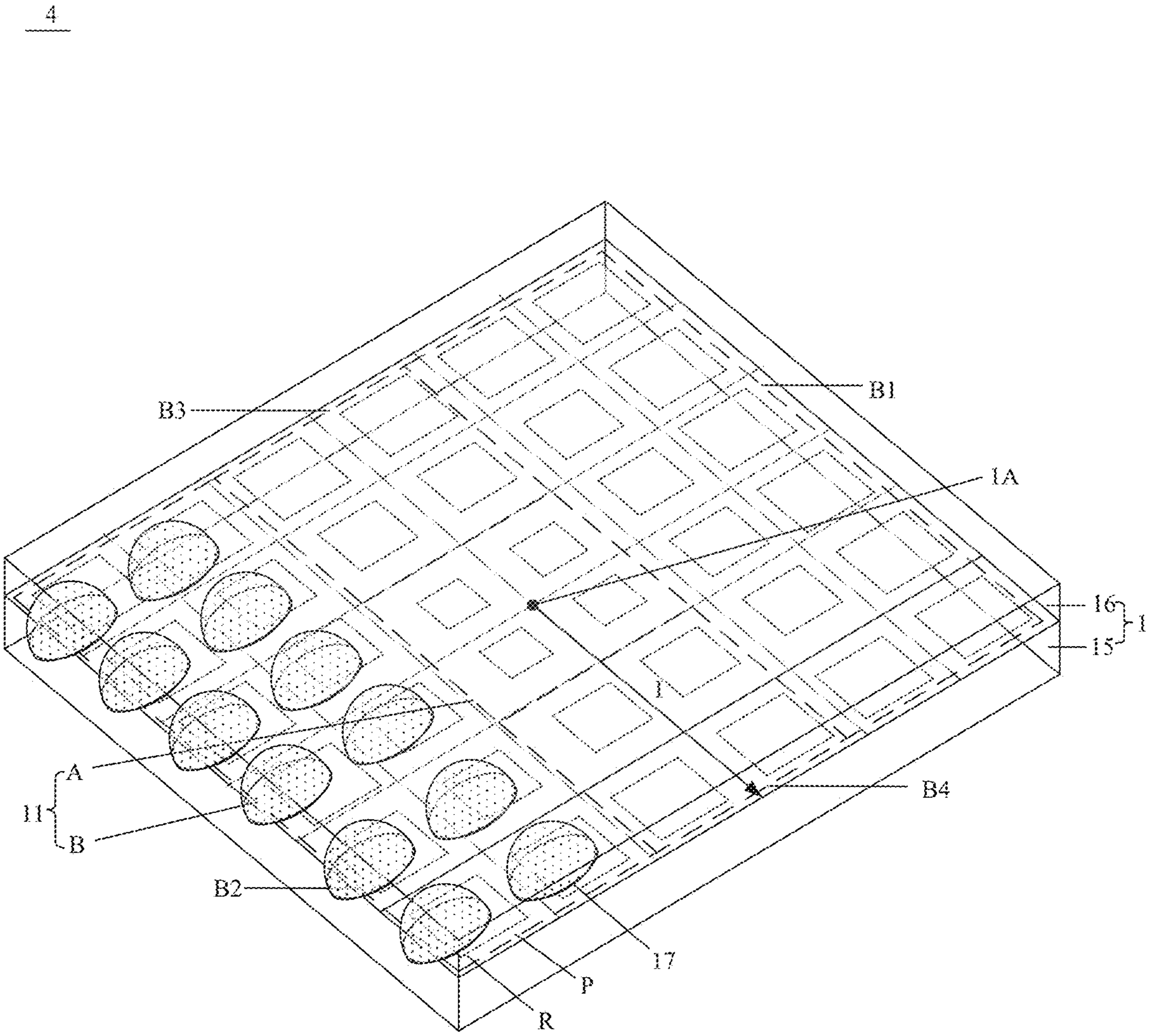
FIG. 12 is a structural diagram of yet another display assembly, in accordance with some embodiments of the present disclosure.

In some embodiments, as shown in FIG. 12, an average value of areas of opening regions R of a plurality of sub-pixels P disposed in the middle display region A is less than an average value of areas of opening regions R of a plurality of sub-pixels P disposed in the peripheral display region B.

It will be understood that the greater an area of the opening region R of the sub-pixel P is, the greater an area of the sub-pixel P used for emitting light is, the more light is emitted and the greater an intensity of the light emitted is.

By making the average value of the areas of the opening regions R of the plurality of sub-pixels P disposed in the middle display region A be less than the average value of the areas of the opening regions R of the plurality of sub-pixels P disposed in the peripheral display region B, a sum of light-emitting areas of the middle display region A is less than a sum of light-emitting areas of the peripheral display region B. As a result, the amount of the light received by the first region 2A of the optical device 2 is reduced, and the intensity of the light received by the first region 2A is reduced, thereby reducing the difference between the intensity of the light received by the second region 2B of the optical device 2 and the intensity of the light received by the first region 2A of the optical device 2.

In some embodiments, as shown in FIG. 12, in a direction I from a center of the display panel 1 to an edge of the display panel 1, the areas of the opening regions R of the sub-pixels P progressively increase.

It will be understood that the "direction I" may be a direction from the center of the display panel 1 to any point on the edge of the display panel 1, and FIG. 12 shows an example of the direction I.

With the above arrangement, in the direction I from the center of the display panel 1 to the edge of the display panel 1, the areas of the opening regions R of the sub-pixels P progressively increase, and light-emitting areas of the sub-pixels P progressively increase, which may reduce the difference between intensities of light received by the optical device 2 in different regions in the direction I, improve the control accuracy of the intensities of the light received by the optical device 2 in different regions in the direction I, and further improve the luminance uniformity of the pictures seen by the human eyes 3.

In some embodiments, in the direction I from the center of the display panel 1 to the edge of the display panel 1, the areas of the opening regions R of the sub-pixels P stepwise increase.

For example, in the direction I from the center of the display panel 1 to the edge of the display panel 1, there are $3\times N$ rows of sub-pixels in sequence, where N is greater than or equal to 2 ($N\geq 2$). Opening areas of sub-pixels from a first row to an N-th row are equal, which are S1; opening areas of sub-pixels from a $(N+1)$-th row to a $2\times N$-th row are equal, which are S2; opening areas of sub-pixels from a $(2N+1)$-th row to a $3\times N$-th row are equal, which are S3; and S3 is greater than S2 and S2 is greater than S1 ($S3>S2>S1$).

For example, the areas of the opening regions R of the plurality of sub-pixels P disposed in the middle display region A are equal, the areas of the opening regions R of the plurality of sub-pixels P disposed in the peripheral display region B are equal, and the area of the opening region R of the sub-pixel P disposed in the middle display region A is less than the area of the opening region R of the sub-pixel P disposed in the peripheral display region B.

For example, a ratio of the area of the opening region R of the sub-pixel P disposed in the middle display region A to the area of the opening region R of the sub-pixel P disposed in the peripheral display region B is greater than 0, and less than or equal to 0.8.

In some embodiments, as shown in FIG. 12, an area of the opening region R of the sub-pixel P corresponding to the lens 17 is greater than an area of the opening region R of the sub-pixel P not corresponding to the lens 17, and thus a sum of light-emitting areas of the sub-pixels P corresponding to the lenses 17 is greater than a sum of light-emitting areas of the sub-pixels P not corresponding to the lenses 17.

In some embodiments, as shown in FIGS. 3A and 3B, the display panel 1 further includes a display substrate 15 and an encapsulation layer 16, and the encapsulation layer 16 is disposed between the display substrate 15 and the light adjusting layer 12. The light adjusting layer 12 and the display substrate 15 have a distance therebetween due to the existence of the encapsulation layer 16 to ensure that among light emitted from the peripheral display region B, at least a portion of light emitted to the first region 2A of the optical device 2 and at least a portion of light emitted to the outer side of optical device 2 are deflected after passing through the light adjusting layer 12, and emitted to the second region 2B of the optical device 2.

For example, the encapsulation layer 16 may be an encapsulation film, including a first inorganic barrier layer, an organic barrier layer and a second inorganic barrier layer. The first inorganic barrier layer covers the light-emitting side L of the display substrate 15, the organic barrier layer is disposed on a side of the first inorganic barrier layer away from the display substrate 15, and the second inorganic barrier layer is disposed on a side of the organic barrier layer away from the display substrate 15.

The first inorganic barrier layer and the second inorganic barrier layer have a function of blocking moisture and oxygen, and the organic barrier layer has certain flexibility and a function of absorbing moisture, and thus a good encapsulating effect on the display substrate 15 is achieved, and a phenomenon of encapsulating failure is unlikely to occur.

For example, the encapsulation layer 16 has a thickness in a range from 1 μm to 10 μm, inclusive, for example, the thickness may be 1 μm, 3 μm, 5 μm, 8 μm or 10 μm, so that the distance between the light adjusting layer 12 and the display substrate 15 is in the range from 1 μm to 10 μm, inclusive.

Figure 13:
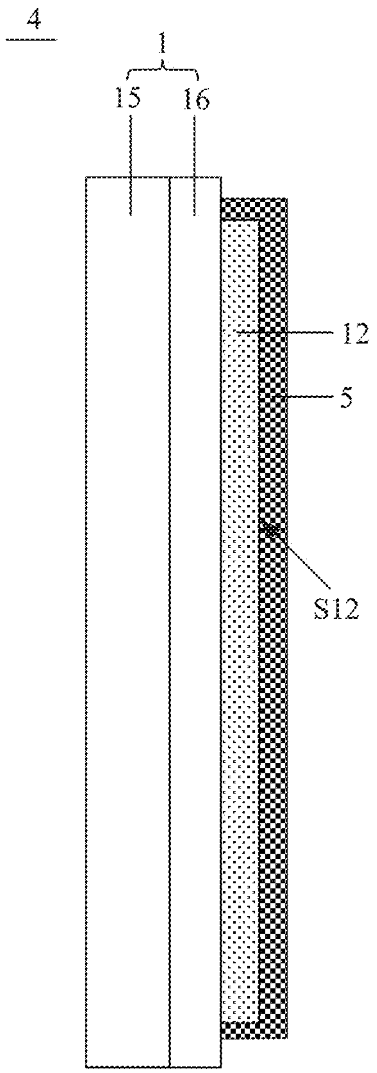
FIG. 13 is a structural diagram of yet another display assembly, in accordance with some embodiments of the present disclosure.

In some embodiments, as shown in FIG. 13, the display assembly 4 further includes a protective layer 5, the protective layer 5 covers a surface S12 of the light adjusting layer 12 away from the display panel 1, and a refractive index of the protective layer 5 is less than a refractive index of the light adjusting layer 12.

It will be understood that the protective layer 5 can protect the light adjusting layer 12 to prevent the light adjusting layer 12 from being scratched or worn to affect its optical performance. Moreover, in order to avoid total reflection of light at an interface between the light adjusting layer 12 and the protective layer 5, the refractive index of the protective layer 5 needs to be less than the refractive index of the light adjusting layer 12.

In order to verify the above embodiments, following simulation experiments are performed.

COMPARATIVE EXAMPLE

Parameter settings: a display panel 1 has a length of 5.09 mm and a width of 2.86 mm; an optical device 2 has a length of 29.09 mm and a width of 16.35 mm; a distance between the display panel 1 and the optical device 2 is 30 mm; a size of an opening region R of a sub-pixel P is 3.5 μm×2.8 μm; a diameter of pupils of human eyes 3 is 3 mm; and areas of opening regions R of sub-pixels P in the display panel 1 are equal, and a light adjusting layer 12 is not provided.

Embodiment 1

Parameter settings: a display panel 1 has a length of 5.09 mm and a width of 2.86 mm; an optical device 2 has a length of 29.09 mm and a width of 16.35 mm; a distance between the display panel 1 and the optical device 2 is 30 mm; the diameter of the pupils of the human eyes 3 is 3 mm; a plurality of lenses 17 are provided in a second sub-region B2 of a display region 11, and a shape of an orthographic projection of each lens 17 on the display panel 1 is a circle with a diameter of 4.76 μm; the lens 17 has a height of 1.70 μm and a focal length of 5.87 μm; a distance between a center 171 of the lens 17 and a center R1 of an opening region R of a sub-pixel P corresponding thereto is 3.6 μm; the second sub-region B2 is rectangular, and an area of the second sub-region B2 accounts for one third of an area of the display region 11 of the whole display panel 1; and an area of an opening region R of each sub-pixel P disposed in a middle display region A is 1.75 μm×1.40 μm, and an area of an opening region R of each sub-pixel P disposed in a peripheral display region B is 3.5 μm×2.8 μm.

Embodiment 2

Parameter settings: a display panel 1 has a length of 5.09 mm and a width of 2.86 mm; an optical device 2 has a length of 29.09 mm and a width of 16.35 mm; a distance between the display panel 1 and the optical device 2 is 30 mm; the diameter of the pupils of the human eyes 3 is 3 mm; a plurality of lenses 17 are provided in a second sub-region B2 of a display region 11, and a shape of an orthographic projection of each lens 17 on the display panel 1 is a circle with a diameter of 4.76 μm; the lens 17 has a height of 1.70 μm and a focal length of 5.87 μm; a distance between a center 171 of the lens 17 and a center R1 of an opening region R of a sub-pixel P corresponding thereto is 3.3 μm; the second sub-region B2 is rectangular, and an area of the second sub-region B2 accounts for one third of an area of the display region 11 of the whole display panel 1; and an area of an opening region R of each sub-pixel P disposed in a middle display region A is 2 μm×1.75 μm, and an area of an opening region R of each sub-pixel P disposed in a peripheral display region B is 3.5 μm×2.8 μm.

According to the above parameter settings, simulations are performed by using to optical simulation software, and the results are shown in FIGS. 14 to 17, where “Y coordinate value” refers to a viewing angle in the first direction Y, and “X coordinate value” refers to a viewing angle in the second direction X, different gray scales in the figures represent different angular spatial radiances. By analyzing light-emitting luminances of the display panel 1 at various viewing angles in the first direction Y, the following results can be obtained.

Figure 14:
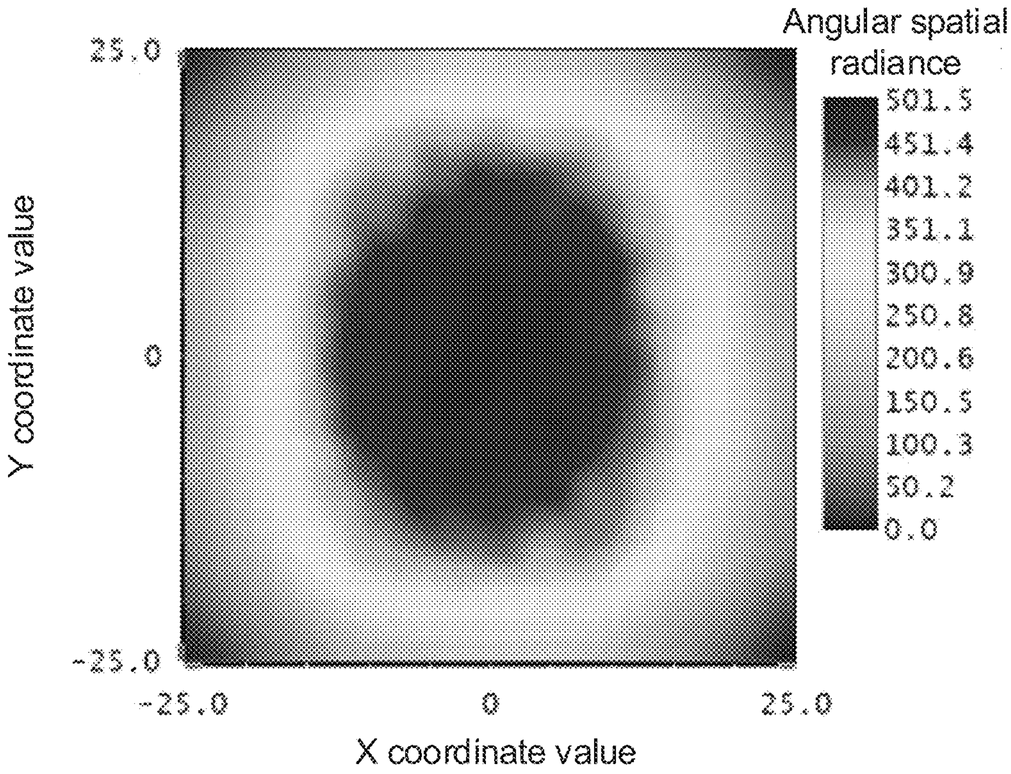
FIG. 14 is an optical simulation diagram of a comparative example in the related art.
Figure 17:
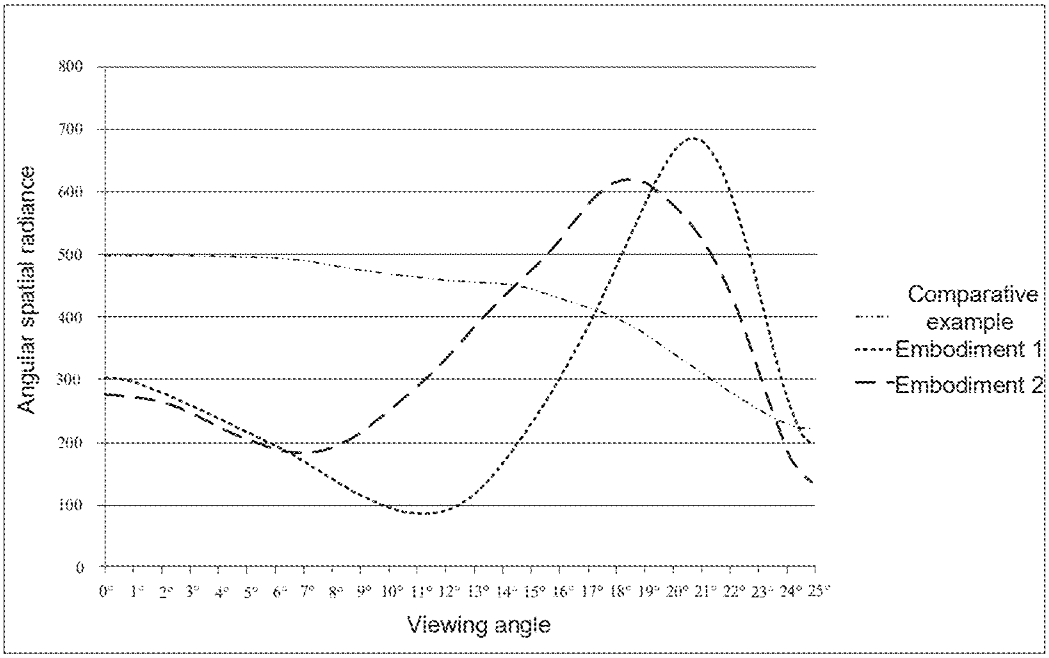
FIG. 17 is a curve graph showing a relationship between light-emitting luminance and viewing angle of a display assembly.

In the comparative example, as shown in FIGS. 14 and 17, a luminance at a viewing angle of 0° is the highest, which is approximately 500 nits; an average luminance at viewing angles from −5° to 5° is approximately 490 nits, and an average luminance at viewing angles from 17° to 22° is approximately 350 nits, and a luminance deviation is $$1-\frac{350}{490}=29\%.$$

Figure 15:
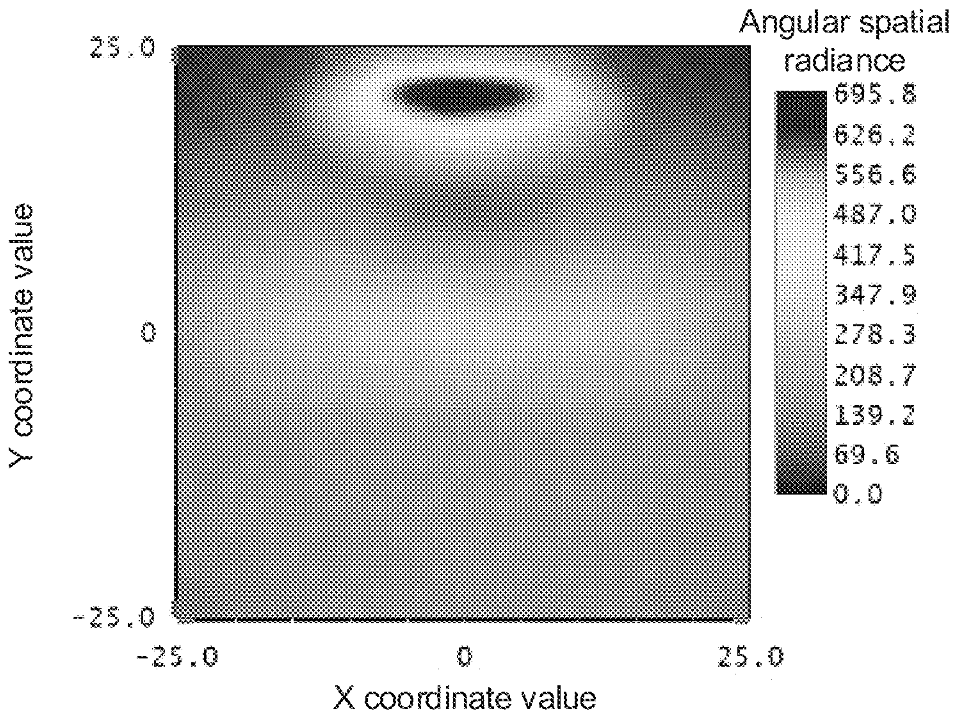
FIG. 15 is an optical simulation schematic diagram, in accordance with some embodiments of the present disclosure.

In Embodiment 1, as shown in FIGS. 15 and 17, a luminance at a viewing angle of 20° is the highest, which is approximately 696 nits; an average luminance at viewing angles from 17° to 22° is approximately 580 nits, and an average luminance at viewing angles from −5° to 5° is approximately 490 nits, and a luminance deviation is $$1-\frac{490}{580}=16\%.$$

Figure 16:
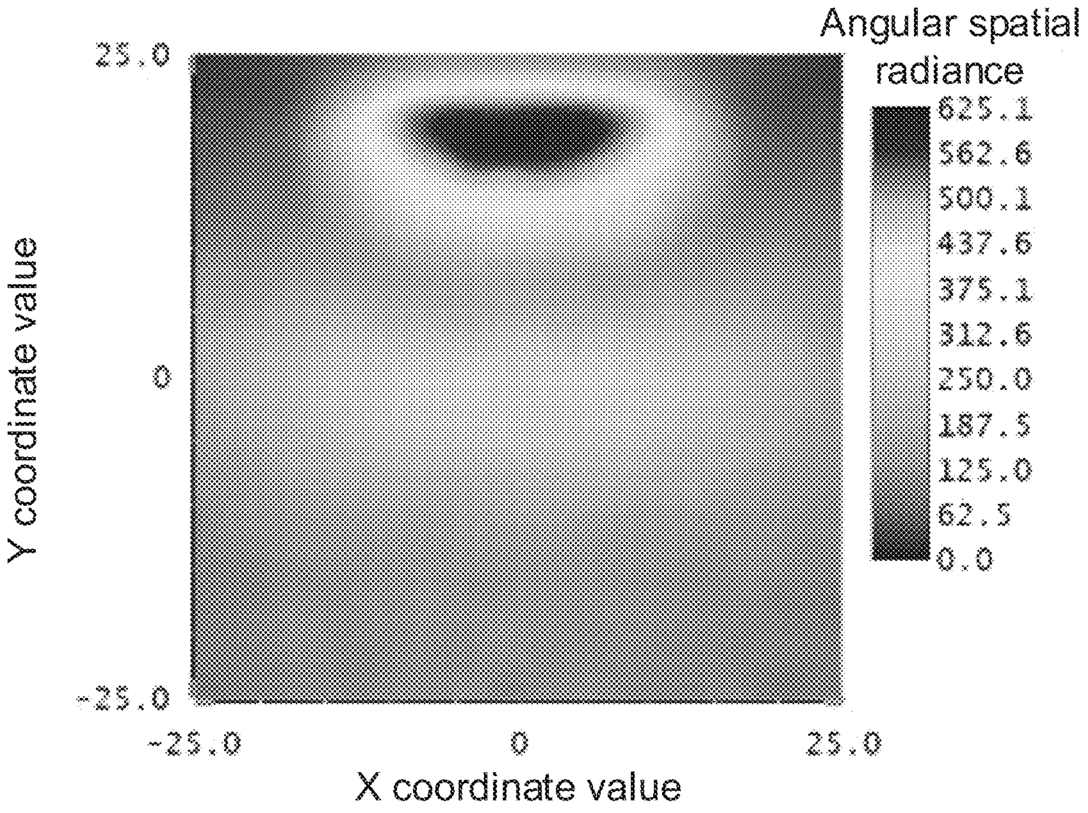
FIG. 16 is another optical simulation schematic diagram, in accordance with some embodiments of the present disclosure.

In Embodiment 2, as shown in FIGS. 16 and 17, a luminance at a viewing angle of 18° is the highest, which is approximately 625 nits; an average luminance at viewing angles from 17° to 22° is approximately 560 nits, and an average luminance at viewing angles from −5° to 5° is approximately 490 nits, and a luminance deviation is $$1-\frac{490}{560}=12.5\%.$$

By analyzing the above data, it is found that by providing the lenses 17 on the light-emitting side L of the display panel 1 and making the area of the opening region R of the sub-pixel P disposed in the middle display region A be less than the area of the opening area R of the sub-pixel P disposed in the peripheral display region B, the luminance uniformity of the pictures seen by the human eyes 3 may be improved and the display effect of the display panel 1 may be improved.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A display assembly, comprising:

a display panel having a display region, the display region including a middle display region and a peripheral display region located around the middle display region; the display panel being configured to project light towards an optical device; and a light adjusting layer disposed on a light-emitting side of the display panel, the light adjusting layer includes at least one light adjusting unit, a light adjusting unit includes a plurality of lenses arranged in an array or a single lens; an orthographic projection of the light adjusting layer on the display panel at least partially overlapping with the peripheral display region; the light adjusting layer being configured to: deflect at least a portion of light emitted to a first region of the optical device and deflect at least a portion of light emitted to an outer side of the optical device among light emitted from the peripheral display region of the display panel, after passing through the light adjusting layer; and transmit the deflected light to a second region of the optical device; wherein the second region is farther away from a center of the optical device than the first region;

wherein the display panel includes a plurality of sub-pixels disposed in the display region, each sub-pixel has an opening region; and an average value of areas of opening regions of sub-pixels disposed in the middle display region is less than an average value of areas of opening regions of sub-pixels disposed in the peripheral display region.

2. The display assembly according to claim 1, wherein the peripheral display region includes: a first sub-region and a second sub-region located on opposite sides of the middle display region in a first direction, and a third sub-region and a fourth sub-region located on opposite sides of the middle display region in a second direction; the first direction intersects with the second direction;

the light adjusting unit is located in at least one sub-region of the first sub-region, the second sub-region, the third sub-region and the fourth sub-region; and the light adjusting unit is configured to: deflect at least a portion of light emitted to the first region of the optical device and at least a portion of light emitted to the outer side of the optical device among light emitted from the sub-region where the light adjusting unit is located, after passing through the light adjusting unit; and transmit the deflected light to the second region of the optical device.

3. The display assembly according to claim 2, wherein the light adjusting layer includes two first light adjusting units, the two first light adjusting units are located in the first sub-region and the second sub-region; and/or the light adjusting layer includes two second light adjusting units, the two second light adjusting units are located in the third sub-region and the fourth sub-region.

4. The display assembly according to claim 2, wherein in a case where the light adjusting unit includes the plurality of lenses arranged in an array, each lens corresponds to at least one sub-pixel disposed in a sub-region where the light adjusting unit is located, and an orthographic projection of each lens on the display panel at least partially overlaps with an opening region of the at least one sub-pixel corresponding thereto; or in a case where the light adjusting unit includes the single lens, the lens corresponds to at least one sub-pixel disposed in a sub-region where the lens is located, and an orthographic projection of the lens on the display panel at least partially overlaps with an opening region of the at least one sub-pixel corresponding thereto.

5. The display assembly according to claim 4, wherein sub-pixels corresponding to different lenses are different.

6. The display assembly according to claim 4, wherein in a plane direction of the display panel, the plane direction is perpendicular to a direction from the display panel to the light adjusting layer, a border of the light adjusting unit proximate to the middle display region is farther away from the middle display region than a border of the sub-region where the light adjusting unit is located proximate to the middle display region, and the light adjusting unit is offset in a direction away from the middle display region relative to the sub-region where the light adjusting unit is located.

7. The display assembly according to claim 6, wherein in the plane direction of the display panel, a border of the lens proximate to the middle display region is farther away from the middle display region than a border of a region where the at least one sub-pixel corresponding thereto is located proximate to the middle display region.

8. The display assembly according to claim 4, wherein in a case where the light adjusting unit includes the plurality of lenses, each lens corresponds to a single sub-pixel, and the orthographic projection of each lens on the display panel partially overlaps with an opening region of the sub-pixel corresponding thereto; and in a plane direction of the display panel, the plane direction is perpendicular to a direction from the display panel to the light adjusting layer, a border of the lens proximate to the middle display region is farther away from the middle display region than a border of the opening region of the sub-pixel corresponding thereto proximate to the middle display region, and the lens is offset in a direction away from the middle display region relative to the opening region of the sub-pixel corresponding thereto.

9. The display assembly according to claim 8, wherein in a direction parallel to a border of the middle display region proximate to the lens, a dimension of the lens is greater than a dimension of the opening region of the sub-pixel corresponding thereto.

10. The display assembly according to claim 8, wherein in a symmetric line of a surface of the lens facing the display panel and along a direction from the middle display region to the lens, the symmetric line is parallel to the first direction, a border of the lens away from the middle display region is located in a space region between the opening region of the sub-pixel corresponding thereto and an opening region of a sub-pixel adjacent to the sub-pixel.

11. The display assembly according to claim 8, wherein a center of the lens is farther away from the middle display region of the display panel than a center of the opening region of the sub-pixel corresponding thereto.

12. The display assembly according to claim 8, wherein an area of the opening region of the sub-pixel corresponding to the lens is greater than an area of an opening region of each of sub-pixels not corresponding to the lens.

13. The display assembly according to claim 4, wherein a surface of the lens away from the display panel includes a curved surface convex relative to the display panel.

14. The display assembly according to claim 4, wherein a surface of the lens away from the display panel includes at least one of a spherical surface, an ellipsoidal surface, a cambered surface and a sawtooth surface; and/or a shape of the orthographic projection of the lens on the display panel is a circle, an ellipse or a rectangle.

15. The display assembly according to claim 1, wherein in a direction from a center of the display panel to an edge of the display panel, areas of opening regions of the plurality of sub-pixels increase.

16. The display assembly according to claim 1, wherein the display panel includes:

a display substrate; and an encapsulation layer disposed between the display substrate and the light adjusting layer.

17. The display assembly according to claim 1, further comprising:

a protective layer covering a surface of the light adjusting layer away from the display panel, a refractive index of the protective layer being less than a refractive index of the light adjusting layer.

18. A display apparatus, comprising:

the display assembly according to claim 1; and an optical device disposed at a light-emitting side of the display assembly, the optical device being configured to receive light emitted from the display assembly.

19. A virtual reality/augmented reality (VR/AR) display device, comprising the display apparatus according to claim 18.

* * * * *